US012470981B2

(12) United States Patent
Prakash et al.

(10) Patent No.: US 12,470,981 B2
(45) Date of Patent: Nov. 11, 2025

(54) PASSTHROUGH OF MESSAGES IN AN ACCELERATOR OF A DISTRIBUTED UNIT

(71) Applicant: QUALCOMM Incorporated, San Diego, CA (US)

(72) Inventors: Rajat Prakash, San Diego, CA (US); Andrei Dragos Radulescu, La Jolla, CA (US); Kalyan Kuppuswamy, San Diego, CA (US); Orod Raeesi, Uusimaa (FI); John Wallace Nasielski, San Diego, CA (US); Abhishek Saurabh Sachidanand Sinha, San Diego, CA (US); Michael Francis Garyantes, Bradley Beach, NJ (US); Douglas Knisely, Redmond, WA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 17/933,651

(22) Filed: Sep. 20, 2022

(65) Prior Publication Data

US 2023/0087665 A1 Mar. 23, 2023

Related U.S. Application Data

(60) Provisional application No. 63/261,507, filed on Sep. 22, 2021.

(51) Int. Cl.
*H04W 28/06* (2009.01)
*H04W 28/12* (2009.01)

(52) U.S. Cl.
CPC .......... *H04W 28/065* (2013.01); *H04W 28/12* (2013.01)

(58) Field of Classification Search
CPC ... H04W 28/065; H04W 28/12; H04W 40/00; H04W 40/02; H04W 88/00;
(Continued)

(56) References Cited

U.S. PATENT DOCUMENTS

2015/0334037 A1\* 11/2015 Han ...................... H04L 67/568
370/230
2021/0184795 A1\* 6/2021 Ibars Casas ...... H03M 13/6561
(Continued)

FOREIGN PATENT DOCUMENTS

WO 2020242987 A1 12/2020

OTHER PUBLICATIONS

International Search Report and Written Opinion—PCT/US2022/076796—ISA/EPO—Dec. 6, 2022.
(Continued)

*Primary Examiner* — Robert C Scheibel
*Assistant Examiner* — Muhammad Ainul Huda
(74) *Attorney, Agent, or Firm* — Guang Y. Zhang; Harrity & Harrity, LLP

(57) ABSTRACT

Various aspects of the present disclosure generally relate to wireless communication. In some aspects, an open radio access network (O-RAN) distributed unit (O-DU) may generate, at an O-DU application that executes on the O-DU, a first message that does not make use of an O-DU accelerator of the O-DU that is in-line with the O-DU application. The O-DU may transmit, from the O-DU application to an O-RAN radio unit (O-RU), the first message via a passthrough of the O-DU accelerator, wherein the first message does not make use of the O-DU accelerator based at least in part on a payload of the first message being transferred unchanged by the O-DU accelerator to the O-RU. Numerous other aspects are described.

30 Claims, 11 Drawing Sheets

(58) Field of Classification Search
CPC . H04W 56/002; H04W 88/10; H04W 88/085; H04B 7/0617
See application file for complete search history.

(56) References Cited

U.S. PATENT DOCUMENTS

2023/0075495 A1\* 3/2023 Goyal ................. H04W 56/002
2024/0045744 A1\* 2/2024 Richards ................ G06F 15/17

OTHER PUBLICATIONS

O-Ran Alliance: "O-RAN Acceleration Abstraction Layer General Aspects and Principles", O-RAN.WG6.AAL-GAnP-v01.00, Technical Specification, 2021, pp. 1-53.
Qualcomm: "How to Build High-Performance 5G Networks with vRAN and O-RAN?", Feb. 17, 2021, 25 Pages.
Qualcomm: "Qualcomm Introduces New 5G Distributed Unit Accelerator Card to Drive Global 5G Virtualized RAN Growth", Jun. 28, 2021, Barcelona, 5 Pages.
"Transition Toward Open & Interoperable Networks", A 5G Americas White Paper, Nov. 2020, 57 Pages.

\* cited by examiner

PASSTHROUGH OF MESSAGES IN AN ACCELERATOR OF A DISTRIBUTED UNIT

CROSS-REFERENCE TO RELATED APPLICATION

This Patent Applications claims priority to U.S. Provisional Patent Application No. 63/261,507, filed on Sep. 22, 2021, entitled "PASSTHROUGH OF MESSAGES IN AN ACCELERATOR OF A DISTRIBUTED UNIT," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for passthrough of messages in an accelerator of a distributed unit.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at an open radio access network (O-RAN) distributed unit (O-DU) includes a memory and one or more processors, coupled to the memory, configured to: generate, at an O-DU application that executes on the O-DU, a first message that does not make use of an O-DU accelerator of the O-DU that is in-line with the O-DU application; and transmit, from the O-DU application to an O-RAN radio unit (O-RU), the first message via a passthrough of the O-DU accelerator, wherein the first message does not make use of the O-DU accelerator based at least in part on a payload of the first message being transferred unchanged by the O-DU accelerator to the O-RU.

In some implementations, a method of wireless communication performed by an O-DU includes generating, at an O-DU application that executes on the O-DU, a first message that does not make use of an O-DU accelerator of the O-DU that is in-line with the O-DU application; and transmitting, from the O-DU application to an O-RU, the first message via a passthrough of the O-DU accelerator, wherein the first message does not make use of the O-DU accelerator based at least in part on a payload of the first message being transferred unchanged by the O-DU accelerator to the O-RU.

In some implementations, a non-transitory computer-readable medium storing a set of instructions for wireless communication includes one or more instructions that, when executed by one or more processors of an O-DU, cause the O-DU to: generate, at an O-DU application that executes on the O-DU, a first message that does not make use of an O-DU accelerator of the O-DU that is in-line with the O-DU application; and transmit, from the O-DU application to an O-RU, the first message via a passthrough of the O-DU accelerator, wherein the first message does not make use of the O-DU accelerator based at least in part on a payload of the first message being transferred unchanged by the O-DU accelerator to the O-RU.

In some implementations, an apparatus for wireless communication includes means for generating, at an application that executes on the apparatus, a first message that does not make use of an accelerator of the apparatus that is in-line with the application; and means for transmitting, from the application to an O-RU, the first message via a passthrough of the accelerator, wherein the first message does not make use of the accelerator based at least in part on a payload of the first message being transferred unchanged by the accelerator to the O-RU.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
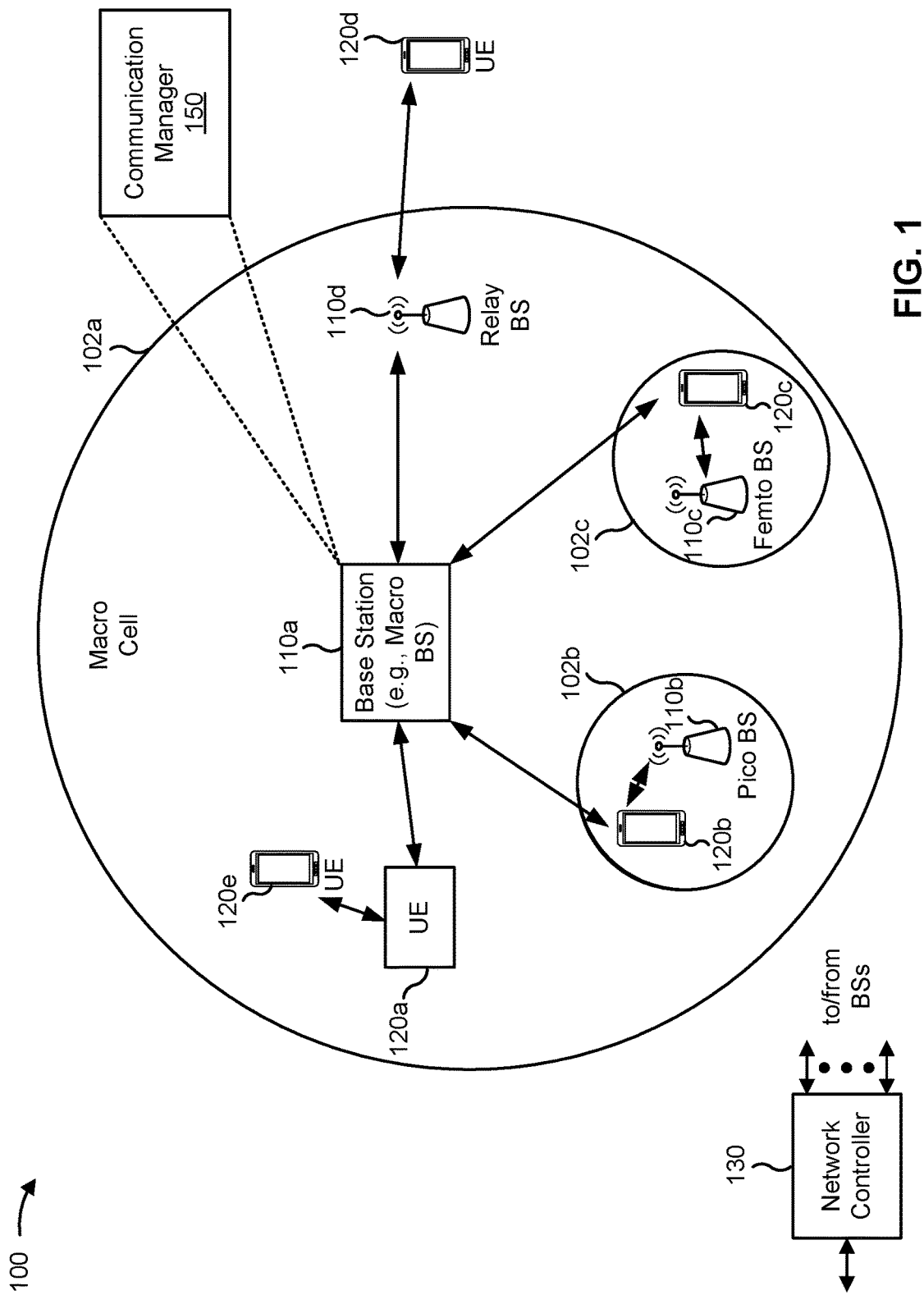
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the terms "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network entity" may refer to one device configured to perform one or more functions, such as those described herein in connection with the base station 110. In some aspects, the terms "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network entity" may refer to any one or more of those different devices. In some aspects, the terms "base station" or "network entity" may refer to one or more virtual base stations and/or one or more virtual base station functions. For example, in some aspects, two or more base station functions may be instantiated on a single device. In some aspects, the terms "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, an open radio access network (O-RAN) distributed unit (DU) (O-DU) (e.g., base station 110) may include a communication manager 150. As described in more detail elsewhere herein, the communication manager 150 may generate, at an O-DU application that executes on the O-DU, a first message that does not make use of an O-DU accelerator of the O-DU that is in-line with the O-DU application; and transmit, from the O-DU application to an O-RAN radio unit (O-RU), the first message via a pass-through of the O-DU accelerator, wherein the first message does not make use of the O-DU accelerator based at least in part on a payload of the first message being transferred unchanged by the O-DU accelerator to the O-RU. Additionally, or alternatively, the communication manager 150 may perform one or more other operations described herein.

As indicated above, FIG. 1 is provided as an example. Other examples may differ from what is described with regard to FIG. 1.

Figure 2:
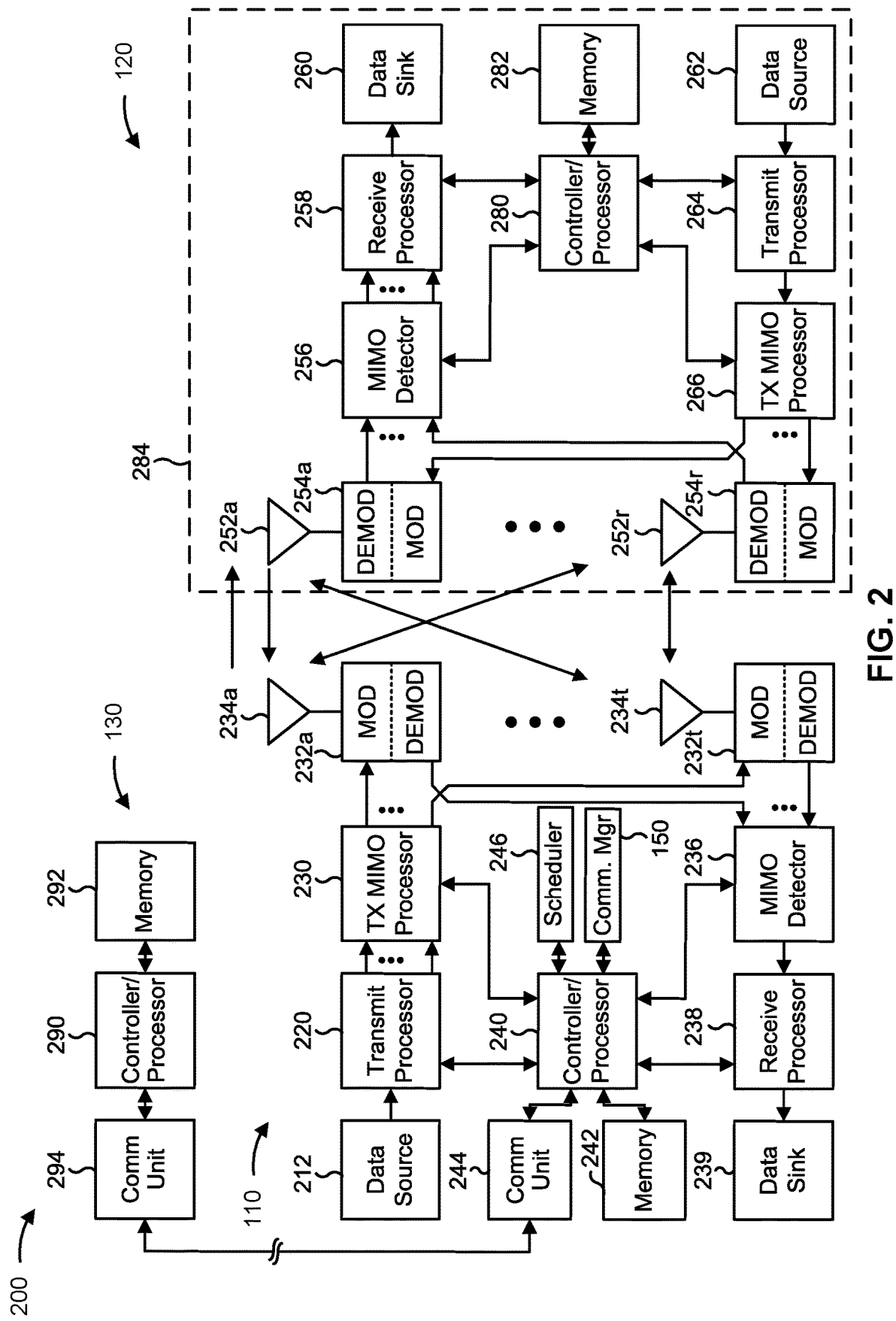
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with passthrough of messages in an accelerator of a distributed unit, as described in more detail elsewhere herein. In some aspects, the O-DU described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, an O-DU (e.g., base station 110) includes means for generating, at an O-DU application that executes on the O-DU, a first message that does not make use of an O-DU accelerator of the O-DU that is in-line with the O-DU application; and/or means for transmitting, from the O-DU application to an O-RU, the first message via a passthrough of the O-DU accelerator, wherein the first message does not make use of the O-DU accelerator based at least in part on a payload of the first message being transferred unchanged by the O-DU accelerator to the O-RU. In some aspects, the means for the O-DU to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
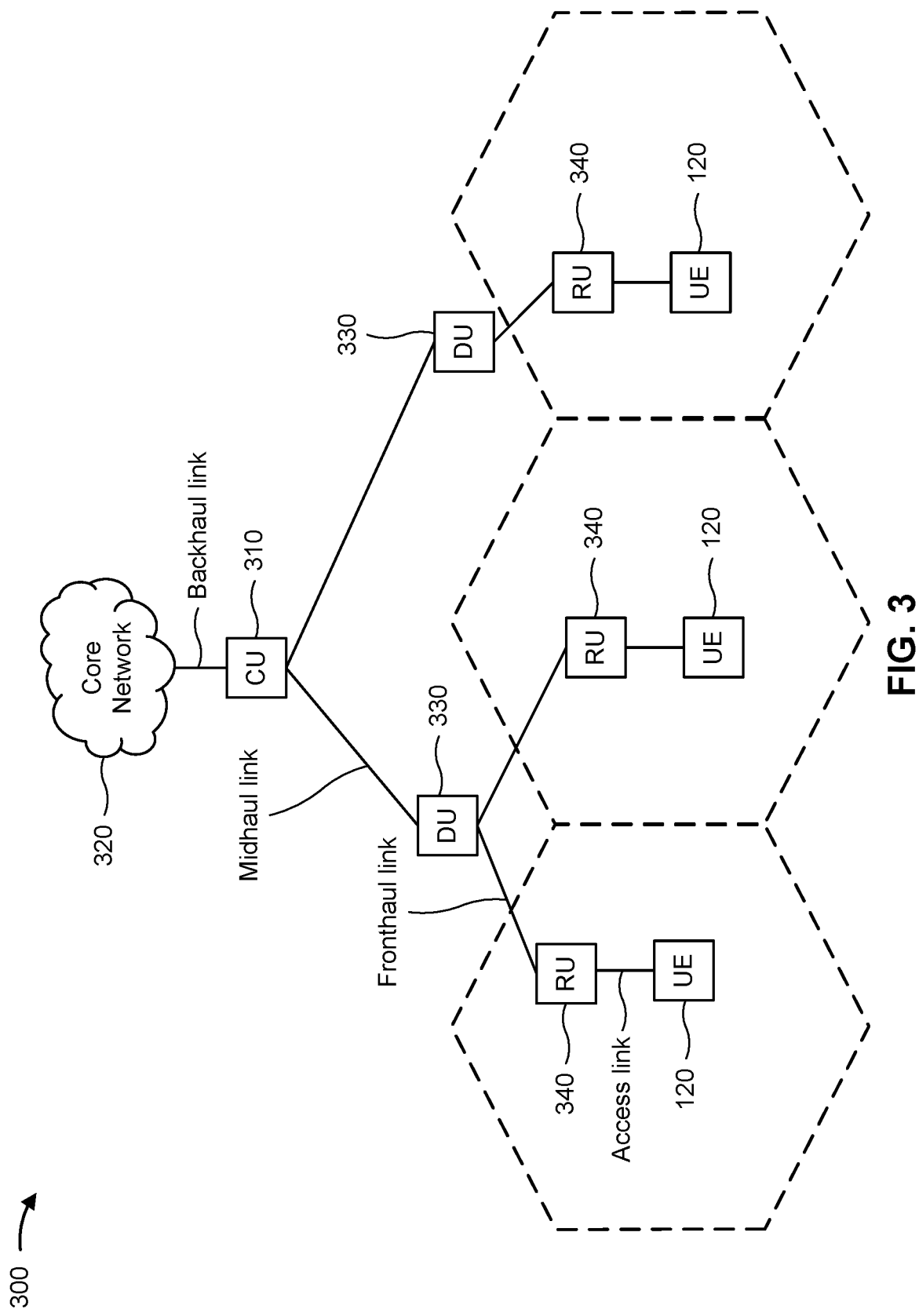
FIGS. 3-4 are diagrams illustrating example of open radio access network (O-RAN) architectures, in accordance with the present disclosure.

FIG. 3 is a diagram illustrating an example 300 of an O-RAN architecture, in accordance with the present disclosure.

As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via RF access links. The DUs 330 and the RUs 340 may also be referred to as O-DUs 330 and O-RUs 340, respectively.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

As indicated above, FIG. 3 is provided as an example. Other examples may differ from what is described with regard to FIG. 3.

Figure 4:
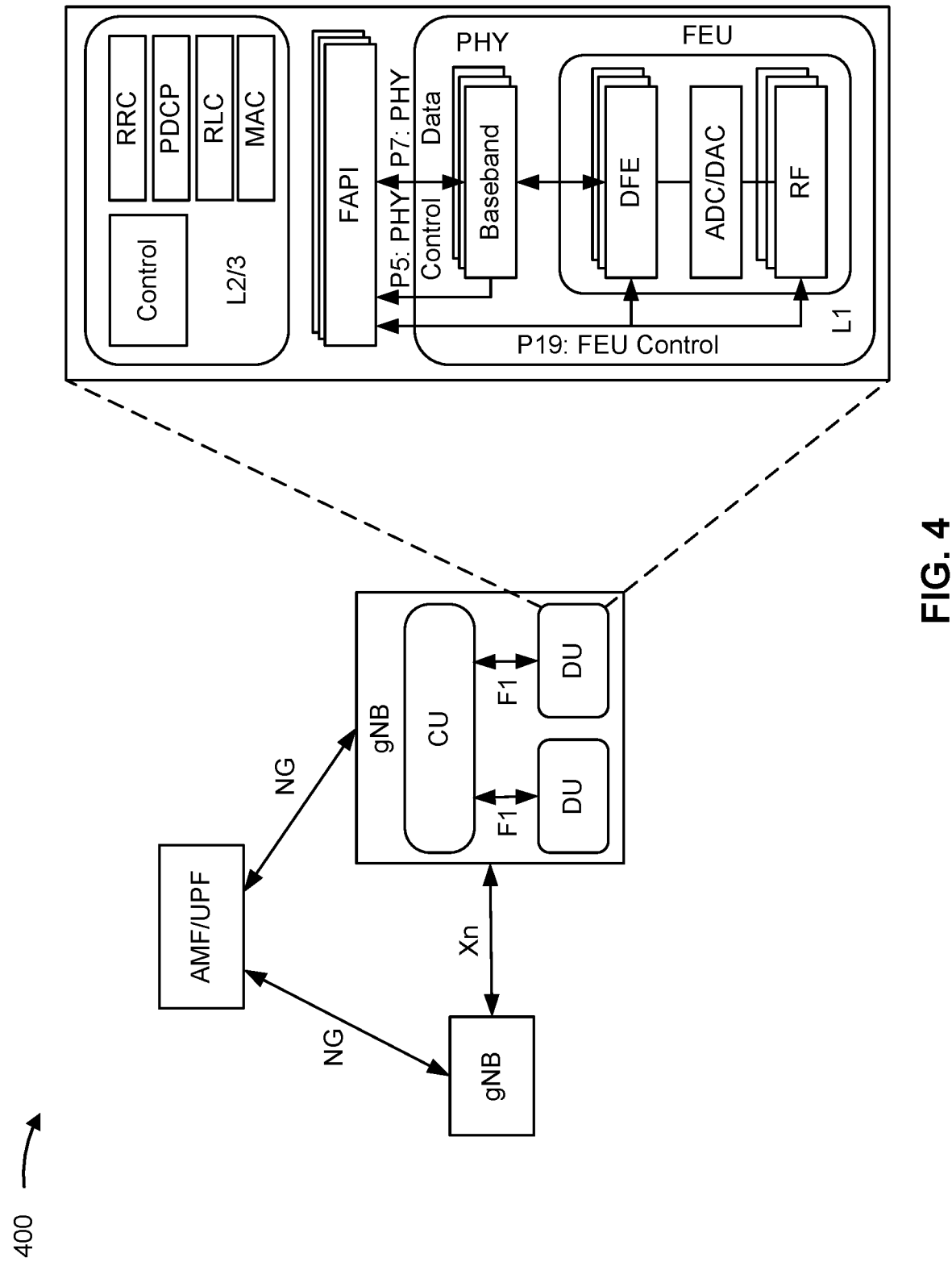

FIG. 4 is a diagram illustrating an example 400 of an O-RAN architecture, in accordance with the present disclosure.

In an O-RAN architecture, an access and mobility management function (AMF) or a user plane function (UPF) may be connected to one or more base stations (e.g., gNBs) via a Next Generation (NG) interface. Base stations may be connected to each other via Xn interfaces. A base station may include a CU, which may be connected to one or more DUs of the base station via F1 interfaces.

A DU may include a layer 2 (L2) and a layer 3 (L3), which may be associated with a control layer, an RRC layer, a PDCP layer, an RLC layer, and a MAC layer. An L2/3 may communicate with a layer 1 (L1) via a functional application platform interface (FAPI). The FAPI may enable slot-by-slot operation. The FAPI may be stateless and may enable over-the-air transmissions and receptions. The L1 may be associated with a PHY layer and a front-end unit (FEU). The PHY layer may be associated with a baseband, which may include digital beamforming. The baseband may communicate with the FAPI via a P5 interface, which may be associated with PHY control, and via a P7 interface, which may be associated with PHY data. The FEU may be associated with a digital front-end (DFE), an analog-to-digital converter (ADC) and a digital-to-analog converter (DAC), and an RF, which may be associated with analog beamforming. The DFE and the RF may communicate with the FAPI via a P19 interface, which may be associated with FEU control.

As indicated above, FIG. 4 is provided as an example. Other examples may differ from what is described with regard to FIG. 4.

An O-RAN front haul (FH) (OFH) may provide a stateless interface operating at a symbol resolution between a high PHY layer associated with an O-DU and a low PHY layer associated with an O-RU. The O-RAN FH may be associated with a control plane (C-Plane). The control plane may provide scheduling and beamforming commands, multiple numerologies, channel estimates to the O-RU, unlicensed access support, a section extension for updating beam weights, and/or non-contiguous resource block patterns. The O-RAN FH may be associated with a user plane (U-Plane). The user plane may provide transport of samples scheduled over the control plane (or semi-statically configured over a management plane (M-Plane)), and/or a support of compression. The O-RAN FH may be associated with a synchronization plane, which may provide a profile of protocols and mechanisms for ensuring timely delivery of the control plane and the user plane.

A FAPI may be an interface between an L2/3 and an L1 in an O-DU, whereas the O-RAN FH may provide connectivity between the O-DU and an O-RU. The FAPI may be independent of the O-RAN FH.

The O-DU may employ an accelerator (e.g., a hardware accelerator and an associated library/driver) to improve a performance of the O-DU. The accelerator may be implemented by using the FAPI to support interactions at the O-DU. Since the FAPI has a limited awareness of the O-RAN FH (which may provide connectivity between the O-DU and an O-RU), the accelerator may need to generate O-RAN FH messages for both the control plane and the user plane. However, the accelerator may primarily be valuable for the user plane with respect to in-phase and quadrature (I/Q) signal generation and decoding, or for control plane generation of beamforming weights, and a specific O-DU implementation may not require the assistance of the accelerator for generating other control plane messages or fields. The accelerator may use high performance hardware that is not well suited for complex data structures, but may be well suited for processing FH user plane messages (e.g., I/Q samples to and from the O-RU) or beam weights (e.g., complex-valued samples to or from the O-RU). As a result, generating or receiving the O-RAN FH messages for all control plane and user plane messages may not be as valuable as focusing the accelerator on hardware-intense message generation or reception in the O-DU.

In various aspects of techniques and apparatuses described herein, an O-DU may generate (or receive), at an O-DU application that executes on the O-DU, a control plane message. The O-DU may transmit, between the O-DU application and O-RU, the control plane message via a passthrough of an accelerator of the O-DU that is in-line with the O-DU application. The O-DU accelerator of the O-DU may be in-line between the O-DU application and the O-RU. The control plane message may pass through the accelerator of the O-DU and may not be subjected to hardware acceleration at the accelerator, beyond possible transposition between an application message payload and a transport medium. Such transposition may involve I/Q sample or beamform weight compression or decompression or the addition or removal of transport adaptation. In other words, for passthrough, a message payload may be fully generated or interpreted at the O-DU application, and the accelerator may at most be involved in the transposition of compression/decompression.

Further, the control plane message may be a first message, and the O-DU may generate (or receive), at the accelerator, a second control or user plane message (a second message) based at least in part on a FAPI exchange between the accelerator and the O-DU application. The second message may be generated through hardware acceleration at the accelerator. The O-DU may transmit, via the accelerator to the O-RU, the second message. As a result, certain messages (e.g., control plane messages, such as the first message) generated at the O-DU may pass through the accelerator, while other messages (e.g., control plane messages generated at the O-DU and user plane messages, such as the second message) may be directed to the accelerator for hardware acceleration, thereby improving a performance of the accelerator.

In some aspects, some control plane messages may not be terminated at the accelerator in the O-DU, such that a control plane transparency may be increased for the accelerator. Certain control plane messages may be generated or received in the O-DU application, and these control plane messages may pass through the accelerator and be exchanged with the O-RU. The passthrough of certain control plane messages may minimize book-keeping at the accelerator, as well as minimize a quantity of translations without any added value at the accelerator, thereby improving a performance of the accelerator. The passthrough of certain control plane messages at the accelerator may result in additional cycles available at the accelerator for more high-value functions. Further, the management plane may primarily be terminated in the O-DU application and not in the accelerator. As a result, the FAPI exchanges may be used in a way to extract precisely as much value from the accelerator as needed by the O-DU application.

Figure 5:
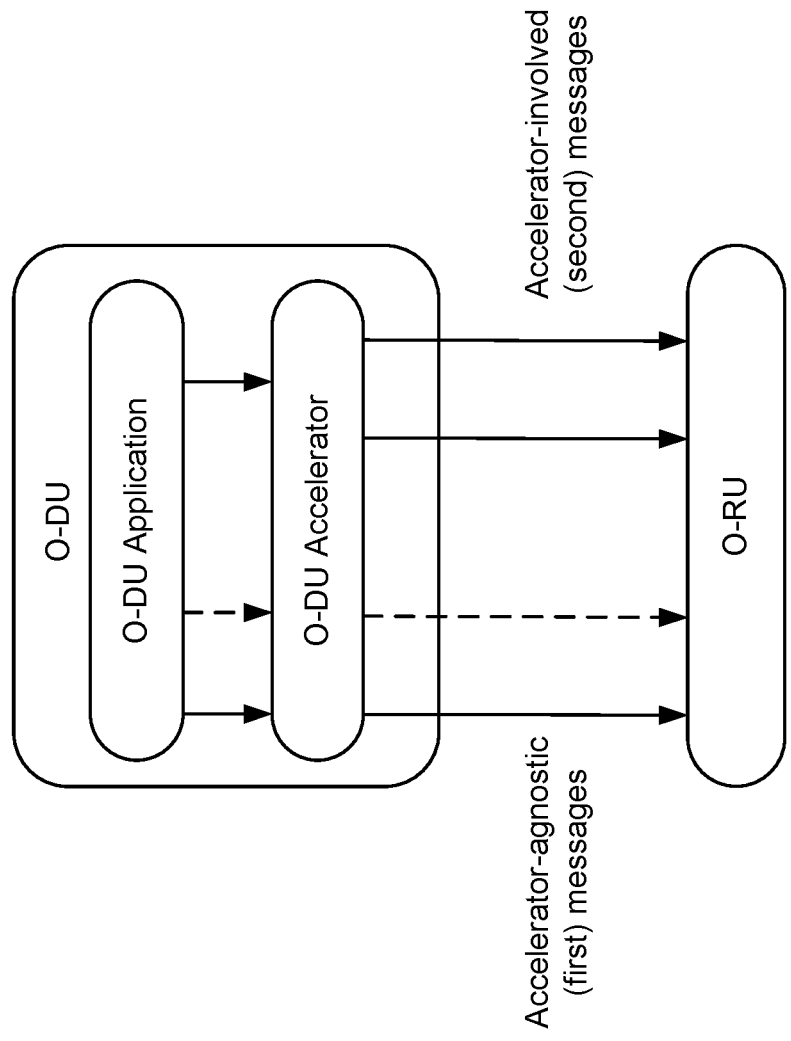
FIGS. 5-6 are diagrams illustrating examples associated with an accelerator passthrough for control plane messages in an O-RAN distributed unit (DU) (O-DU), in accordance with the present disclosure.

FIG. 5 is a diagram illustrating an example 500 associated with an accelerator passthrough for at least some control plane messages in an O-DU, in accordance with the present disclosure.

In some aspects, the O-DU may generate (or expect), at an O-DU application that executes on the O-DU, a control plane message. The O-DU may transmit (or receive), between the O-DU application and an O-RU, the control plane message via a passthrough of an accelerator of the O-DU (or O-DU accelerator) that is in-line with the O-DU application that executes on the O-DU. The O-DU accelerator of the O-DU may be in-line between the O-DU application and the O-RU. The control plane message may pass through the accelerator of the O-DU and may not be subjected to hardware acceleration at the accelerator of the O-DU. In some aspects, the accelerator may support a plurality of channels, and the control plane message may be associated with a channel included in the plurality of channels.

In some aspects, the control plane message may be a first message. The O-DU may generate, at the accelerator of the O-DU, a second message (control or user plane message) based at least in part on a functional application platform interface between the accelerator of the O-DU and the O-DU application that executes on the O-DU. The second message may be generated through hardware acceleration at the accelerator of the O-DU. The O-DU may transmit (or expect), at the accelerator of the O-DU to the O-RU, the second message.

In some aspects, control plane messages partially or fully generated at the O-DU application that executes on the O-DU may be associated (or coordinated) with at least one message payload generated at the accelerator of the O-DU with respect to a time and frequency mapping to data frames, beam indices and weights (e.g., implicit weights or dynamic weights), and/or spatial streams. Implicit weights refer to weights that may be computed or known at the O-RU (e.g., due to prior semi-static configuration or dynamic signaling, or a common awareness of channel and precoder choices between O-DU and O-RU), without explicit signaling in the considered message payload itself.

In some aspects, the first control plane message may be associated with an implicit beam weight, which may indicate that the first control plane message is to be passed through the accelerator of the O-DU. The implicit beam weight may be known or assumed at the O-DU application that executes on the O-DU. The second message (control plane or user plane message) may be associated with dynamic beam weights, which may indicate the second message does not transparently pass through the accelerator of the O-DU, wherein the dynamic beam weights may be generated at the accelerator of the O-DU.

In some aspects, the O-DU may initiate signaling between the O-DU application that executes on the O-DU and the accelerator of the O-DU to negotiate types of messages to be passed through the accelerator of the O-DU and types of messages to not be passed through the accelerator of the O-DU; in some cases, the types of messages may be indicated by scope (e.g., user plane, control plane, or dynamic beamforming), a controlled Uu direction (e.g., uplink or downlink), a fronthaul direction (e.g., upstream or downstream), a channelization (e.g., physical downlink shared channel (PDSCH) or physical uplink shared channel (PUSCH)), or individual message identities (e.g., by section, slot, symbol, resource block (RB) or time, or other message identifying or coupling method). In some aspects, the O-DU may initiate signaling between the O-DU application that executes on the O-DU and the accelerator of the O-DU to negotiate parameters associated with fragmentation and compression to be performed by the O-DU application that executes on the O-DU or the accelerator of the O-DU. In some aspects, the O-DU may initiate, at a management plane entity associated with the O-DU application that executes on the O-DU, management plane signaling with a management plane entity associated with the O-RU, where the management plane signaling may be associated with an O-RU initialization, discovery, or orchestration. In other aspects, the management plane entity may be associated with the O-DU initialization, discovery, or orchestration.

In some aspects, the O-DU may generate (or expect, with respect to a reception), at the O-DU application that executes on the O-DU, section and header information for a message that passes through the accelerator of the O-DU without being subjected to hardware acceleration. Alternatively, the O-DU may generate, at the accelerator of the O-DU, the section and header information for the message based at least in part on input received from the O-DU application that executes on the O-DU.

In some aspects, the O-DU may generate or expect, at the O-DU application that executes on the O-DU, a user or control plane message. The O-DU may transmit, from the O-DU application to the O-RU, the user plane message via the passthrough of the accelerator of the O-DU based at least in part on the accelerator of the O-DU not supporting a channel associated with the user plane message.

In some aspects, the O-DU may generate, at the O-DU application that executes on the O-DU, the first message that does not make use of an O-DU accelerator of the O-DU that is in-line with the O-DU application. The O-DU may transmit, from the O-DU application to the O-RU, the first message via the passthrough of the O-DU accelerator. The first message may not make use of the O-DU accelerator based at least in part on a payload of the first message being transferred unchanged by the O-DU accelerator to the O-RU. The O-DU may generate, via hardware acceleration at the O-DU accelerator, the second message based at least in part on a FAPI between the O-DU accelerator and the O-DU application. The O-DU may transmit, from the O-DU accelerator to the O-RU, the second message. In some aspects, the first message may be a control plane message, and the second message may be a control plane message or a user plane message.

In some aspects, the O-DU may receive, at the O-DU application from the O-RU, a third message via the passthrough of the O-DU accelerator. The O-DU may interpret, at the O-DU application, the third message that does not make use of the O-DU accelerator. The O-DU may receive, at the O-DU accelerator from the O-RU, a fourth message. The O-DU may interpret, at the O-DU accelerator, the fourth message based at least in part on a functional application platform interface between the O-DU accelerator and the O-DU application, where the fourth message may be subjected to hardware acceleration at the O-DU accelerator. In some aspects, the first message and the second message may be associated with O-DU transmitted messages, and the third message and the fourth message may be associated with O-DU received messages.

In some aspects, the first and third messages may be accelerator-agnostic messages that may be generated or interpreted at the O-DU application, and which may transparently pass through the O-DU accelerator. The second and fourth messages may be accelerator-involved messages or accelerator-aware messages, which may require at least one parameter (e.g., a beam weight or an I/Q sample or a decoded sample) to be generated or interpreted by the O-DU accelerator.

In some aspects, the O-DU may support a plurality of channels, and the first message, the second message, the third message, and the fourth message may be associated with one or more channels included in the plurality of channels. In some aspects, first messages generated at the O-DU application may be coordinated with second messages generated at the O-DU accelerator with respect to a time and frequency mapping to data frames, beam indices, or spatial streams, and similarly, third messages interpreted at the O-DU application may be coordinated with fourth messages interpreted at the O-DU accelerator.

In some aspects, to transmit the first message via the passthrough of the O-DU accelerator, the O-DU may embed, at the O-DU accelerator, a payload of the first message over a transport interface towards the O-RU, where the first message may indicate a compression of beam weights, I/Q samples, or other parameters describing a wireless channel associated with the O-DU. In some aspects, to receive the third message via the passthrough of the O-DU accelerator, the O-DU may extract, at the O-DU accelerator, a payload of the third message, where the third message may indicate a decompression of beam weights, I/Q samples, or other parameters describing a wireless channel associated with the O-DU. In other words, the passthrough may only relate to a message payload, and the O-DU accelerator may still be involved for minimal processing, e.g., to transpose the message payload to the transport layer, or compress/decompress beamforming weights. The other parameters describing the wireless channel may pertain to information summarizing or describing the wireless channel (Uu) or samples over the wireless channel (e.g., channel modeling or estimation parameters).

In some aspects, the first message may be associated with a beam weight implicitly knowable to the O-RU indicating that the first message is to be passed through the O-DU accelerator, where the beam weight may be implicitly known to the O-RU based at least in part on a semi-static configuration, a dynamic configuration, or a dynamic implicit generation at the O-RU from a precoder indication from the O-DU. The beam weight may be implicitly known to the O-RU based at least in part on a previous semi-static configuration, a previous (dynamic explicit) signaling, or a dynamic implicit generation at the O-RU from the precoder indication (e.g., layer indexing) by the O-DU. The second message may be associated with O-DU accelerator-generated information including: dynamically-generated information to use in O-DU to O-RU messages, at least one I/Q sample to use in the O-DU to O-RU messages, or at least one parameter signaling a result of accelerator-based decoding when I/Q samples are received from the O-RU. The accelerator-generated information may include at least one dynamically-generated information to use in O-DU to O-RU fronthaul messages (e.g., via a control plane), at least one I/Q sample to use in O-DU to O-RU fronthaul messages (e.g., via a user plane), or at least one parameter signaling the result of accelerator-based decoding if I/Q samples are received from the fronthaul.

In some aspects, the O-DU may initiate signaling between the O-DU application and the O-DU accelerator to negotiate types of messages to be passed through the O-DU accelerator and types of messages to be subjected to hardware acceleration at the O-DU accelerator. In some aspects, the O-DU may initiate signaling between the O-DU application and the O-DU accelerator to negotiate parameters associated with fragmentation or assembly to be performed by the O-DU application or the O-DU accelerator. In some aspects, the O-DU may initiate signaling between the O-DU application and the O-DU accelerator to negotiate parameters associated with compression or decompression to be performed by the O-DU application or the O-DU accelerator.

In some aspects, the O-DU may generate (or interpret), at the O-DU application, section or header information for the second message that passes through the O-DU accelerator without being subjected to hardware acceleration. In some aspects, the O-DU may generate or interpret, at the O-DU accelerator, the section or header information for the second message based at least in part on input received from the O-DU application.

In some aspects, the O-DU may generate, at the O-DU application, the second message. The O-DU may transmit, from the O-DU application to the O-RU, the second message via the passthrough of the O-DU accelerator based at least in part on the O-DU accelerator not supporting a channel associated with the second message. In some aspects, the O-DU may receive, at the O-DU application from the O-RU, the third message via the passthrough of the O-DU accelerator based at least in part on the O-DU accelerator not supporting a channel associated with the third message. The O-DU may interpret, at the O-DU application, the third message that does not make use of the O-DU accelerator.

In some aspects, the O-DU may initiate, at a management plane entity associated with the O-DU application, management plane signaling with a management plane entity associated with the O-RU, where the management plane signaling may be associated with an O-RU initialization, an O-RU discovery, or an O-RU orchestration.

In some aspects, the O-DU may transmit the first message via the passthrough of the O-DU accelerator based at least in part on signaling by the O-DU application of locations at which the O-DU accelerator generates or expects I/Q samples, beam weights, beam indices, channel estimates, or decoded data, where the locations may be associated with first messages that are application-generated or memory locations. In other words, the O-DU accelerator may generate I/Q/beam/channel estimate samples in a memory location, without needing to know how the O-DU application packages that location with other message fields. In some aspects, the O-DU may transmit the first message via the passthrough of the O-DU accelerator based at least in part on signaling by the O-DU application of the I/Q samples, the beam weights, the beam indices, the channel estimates, the decoded data, and other information associated with message headers and parameters to be generated or interpreted by the O-DU accelerator. In other words, the O-DU accelerator may generate both I/Q/beam/CE samples and message headers/parameters, based at least in part on FAPI abstractions. In some aspects, the O-DU may transmit the first message via the passthrough of the O-DU accelerator based at least in part on signaling by the O-DU application of a second type of messages that are to be used by the O-DU accelerator for generation or interpretation of a first type of messages, where the second type of messages may be associated with control plane messages, and the first type of messages may be associated with control plane messages and user plane messages.

As indicated above, FIG. 5 is provided as an example. Other examples may differ from what is described with regard to FIG. 5.

Figure 6:
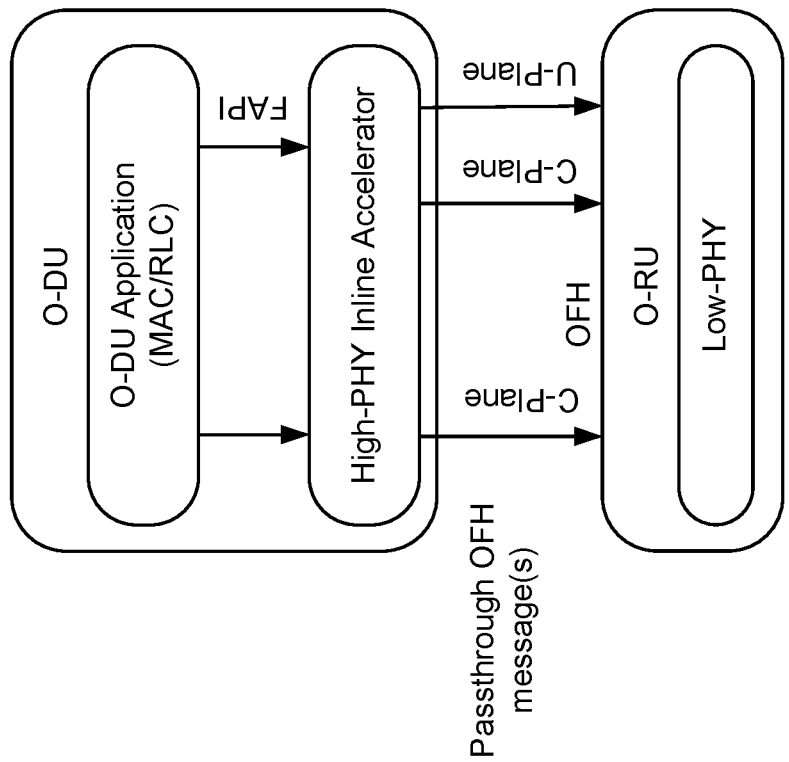

FIG. 6 is a diagram illustrating an example 600 associated with an accelerator passthrough for control plane messages in an O-DU, in accordance with the present disclosure.

In some aspects, similar to FIG. 5, messages from the O-DU to an O-RU are depicted, but messages terminated at the O-DU may also be subjected to accelerator pass-through, or subjected to accelerator processing.

In some aspects, the O-DU may execute an O-DU application, which may be associated with a MAC layer. At the O-DU, a MAC implementation may include some OFH control plane functions. The O-DU application may communicate with an accelerator of the O-DU via a FAPI. The accelerator may include a hardware accelerator. The application may make use of an associated library/driver to communicate with the accelerator. The accelerator may be a high PHY layer inline accelerator. The O-DU may communicate with an O-RU, which may be associated with a low PHY layer. The accelerator may be inline since the accelerator may be in between the O-DU application and the O-RU. In some aspects, the accelerator may generate or expect control plane messages and user plane messages based at least in part on the FAPI between the accelerator and the O-DU application, and the control plane messages and the user plane messages may be transmitted to, or received from, the O-RU. In other words, the control plane messages and the user plane messages generated or expected at the accelerator may be subjected to hardware acceleration at the accelerator. The control plane messages may be OFH control plane messages. In some aspects, certain control plane messages may be generated or expected at the O-DU application. These control plane messages may pass through the accelerator, and then may be transmitted to, or received from, the O-RU. In other words, these control plane messages that are passed through the accelerator may not be subjected to hardware acceleration at the accelerator, which may improve a performance of the accelerator since many control plane messages are not well suited for acceleration and unnecessarily consume cycles at the accelerator that could otherwise be used for more high-value functions.

In some aspects, the O-DU application and the accelerator may negotiate which messages are enabled for passthrough (e.g., which control plane messages pass through the accelerator and are not subjected to hardware acceleration), as well as which messages are not enabled for pass through (e.g., which control plane messages are generated at the accelerator and subjected to the hardware acceleration). The O-DU application may communicate with the accelerator to negotiate which messages have the passthrough enabled.

In some aspects, the accelerator may provide a transparent path for messages between the O-DU application and the O-RU. The transparent path may allow for the passthrough of the messages through the accelerator. In some aspects, while the accelerator does not perform hardware acceleration on the messages, the accelerator may perform other functions for the messages. For example, the accelerator may be responsible for enhanced common public radio interface (eCPRI) headers for the messages. As another example, the accelerator may be responsible for compression or decompression of sample or weight values in the messages. As another example, the accelerator may be responsible for fragmentation/segmentation/aggregation of messages at the point of transposition with the fronthaul transport.

In some aspects, the messages subject to passthrough may include various section identifiers that indicate corresponding resources, and the section identifiers may be referenced in the non-passthrough messages. Section identifier management may involve having consistent section identifiers between the control plane messages and the user plane messages. The O-DU application may be responsible for section identifier handling for control plane messages that pass through the accelerator. The O-DU application may also be responsible for section identifier handling for control plane and/or user plane messages that do not pass through the accelerator (e.g., non-passthrough messages), such that the O-DU application may provide the section identifiers for these non-passthrough messages to the accelerator.

In some aspects, the accelerator may be applicable to a plurality of channels and/or signals, including a PDSCH, a PDSCH DMRS, a physical downlink control channel (PDCCH), a PDCCH DMRS, a physical broadcast channel (PBCH), a PSS/SSS PBCH DMRS, a channel state information reference signal (CSI-RS), a phase tracking reference signal (PT-RS), and/or a tracking reference signal (TRS). In some aspects, the accelerator may provide simultaneous support for the plurality of channels and/or signals, such as the PDSCH, the PDSCH DMRS, the PDCCH, the PDCCH DMRS, the PBCH, the PSS/SSS PBCH DMRS, the CSI-RS, the PT-RS, and/or the TRS. In some examples the accelerator may support specific channels and/or signals.

In some aspects, a passthrough of control plane messages through the accelerator may be beneficial to bypass the generation or interpretation of FAPI messages (e.g., FAPI P19) for interfacing between an O-DU application and a Front End Unit associated with the accelerator, where Front End Unit functions may at least be partially hosted by an O-RU. The FAPI P19 interface may be used for analog beamforming. Since the P19 interface does not directly impact a baseband associated with the accelerator, the O-DU application may directly send OFH control plane messages that bypass the baseband associated with the accelerator, and thereby may bypass the need for terminating a FAPI P19 at the O-DU accelerator. In some aspects, the passthrough of control plane messages through the accelerator may be beneficial for control plane messages having a section type 0, which may signal empty resource blocks, for which user plane information may not be sent and the accelerator may not add any value. In this case, these control plane messages may benefit from passing through the accelerator. In one case, the accelerator may be instructed to avoid generating or interpreting samples for the empty resource blocks. In another case, a recipient of an OFH message associated with empty RBs may be instructed or programmed to disregard samples associated with such empty RBs.

In some aspects, control plane messages generated by the O-DU application may be coordinated or coupled with user plane messages generated by the accelerator. Since the control plane messages and the user plane messages may be generated by different entities in a passthrough approach (e.g., the accelerator may be used to pass through some control plane messages while the user plane control messages may be generated at the O-DU application), a common understanding of certain FH allocation dimensions (or allocation abstractions) may be needed. The FH allocation dimensions may include a time and frequency mapping to data frames, which may be needed for the O-DU to generate and interpret user plane messages. Further, the FH allocation dimensions may include beam management with respect to beam management decisions performed at the O-DU application versus the accelerator in relation to the control plane messages and the user plane messages. Further, the FH allocation dimensions may include spatial beam management in relation to the control plane messages and the user plane messages. The common understanding of the FH allocation dimensions may enable the passthrough approach when the control plane messages and the user plane messages are generated by the different entities.

In some aspects, the accelerator (e.g., a MAC/PHY interface) may support a PHY layer that only generates user plane messages for at least one channel, while the O-DU application (e.g., MAC layer) may generate control plane messages for the channel. In some aspects, the accelerator and the O-DU application may have a capability to negotiate which control plane message are to be passed through the accelerator. The O-DU application may generate beam weights (e.g., DU-generated beam weights) for different control plane messages, where control plane messages related to implicit beam weights may pass through the accelerator and control plane messages signaling dynamic weights may not pass through the accelerator. In some aspects, the accelerator and the O-DU application may negotiate a per-channel control plane generation (e.g., channels for which the control plane messages are generated). The accelerator and the O-DU application may negotiate a per-channel user plane generation (e.g., channels for which the user plane messages are generated). In some aspects, the accelerator and the O-DU application may negotiate whether the accelerator or the O-DU application is to handle fragmentation of data based at least in part on a maximum frame size. In some aspects, the accelerator and the O-DU application may negotiate parameters associated with compression to be performed at the accelerator or the O-DU application.

In some aspects, for messages that are not passthrough messages based at least in part on DU-generated beam weights, section and header generation for the messages may be handled by either the O-DU application or the accelerator. The messages may each include section and header information. In some aspects, the O-DU application may generate the section and header information for the messages. Alternatively, the accelerator may generate the section and header information for the messages based at least in part on an input received from the O-DU application. In other words, in this case, the O-DU application may provide the input to assist the accelerator in generating the section and header information.

In some aspects, for passthrough of control plane messages, signaling of allocation abstractions (or FH allocation dimensions) from the O-DU application to the accelerator (or high PHY layer) may be supported, where the signaling of allocation abstractions may be associated with a frequency and time mapping, separate management of beam indices (e.g., O-DU application generated or implicit weights or accelerator generated or dynamic weights), and/or extended antenna carriers (eAxCs) mapping for a plurality of RU categories. The signaling of allocation abstractions may enable the accelerator to generate or interpret messages that are associated with the control plane messages generated by the O-DU application, with respect to the frequency and time mapping, the separate management of beam indices, and the eAxCSs mapping for the plurality of RU categories. In some aspects, the signaling of allocation abstractions may enable a generation of FAPI data structures that allow the accelerator to generate/receive user plane I/Q samples and beam weights in a manner as expected by the FH. In some aspects, the signaling of allocation abstractions may enable the accelerator to pass through control plane messages directly, with optional linkage between FAPI channels and related control plane sections and couplings. In some aspects, the signaling of allocation abstractions may enable shared memory locations for the accelerator to write/retrieve I/Q samples, where the shared memory locations may be between the O-DU and the O-RU. In a specific example, the shared memory locations may be between the O-DU/O-RU FH eCPRI transport and accelerator module. In some aspects, the signaling of allocation abstraction may enable concatenation or interpretation of application-generated message headers, header parameters, or application-indicated header parameters with message sections for generating or interpreting I/Q samples or weights at the accelerator.

In some aspects, the signaling of allocation abstractions may include rate matching associations, where a MAC layer may identify overlaps between PDSCH allocations and other channels, which may enable a generation of section priority information. The signaling of allocation abstractions may include beamforming and precoding information, such as information regarding precoders, beams, and/or weights. The signaling of allocation abstractions may include the eAxCSs mapping, where the MAC layer may identify various spatial streams.

In some aspects, a set of FAPI hard-coded or explicit capabilities may indicate restrictions associated with the frequency and time mapping, the separate management of beam indices, and the eAxCSs mapping for the plurality of RU categories. For example, such restrictions may be associated with a shape of a frequency and time area, resource element patterns, types of couplings supported by the O-RAN, a quantity of abstractions per channel where a particular abstraction maps to an allocation of physical resource blocks (PRBs) and symbols, and/or supported extension types.

In some aspects, for non-passthrough channels, the FAPI may be updated for input/output other than MAC transport blocks (TBs), such as modulated symbols, codeword bits or code block bits, or modulation symbols. Depending on the input/output, certain FAPI parameter values may become "don't care" values.

As indicated above, FIG. 6 is provided as an example. Other examples may differ from what is described with regard to FIG. 6.

Figure 7:
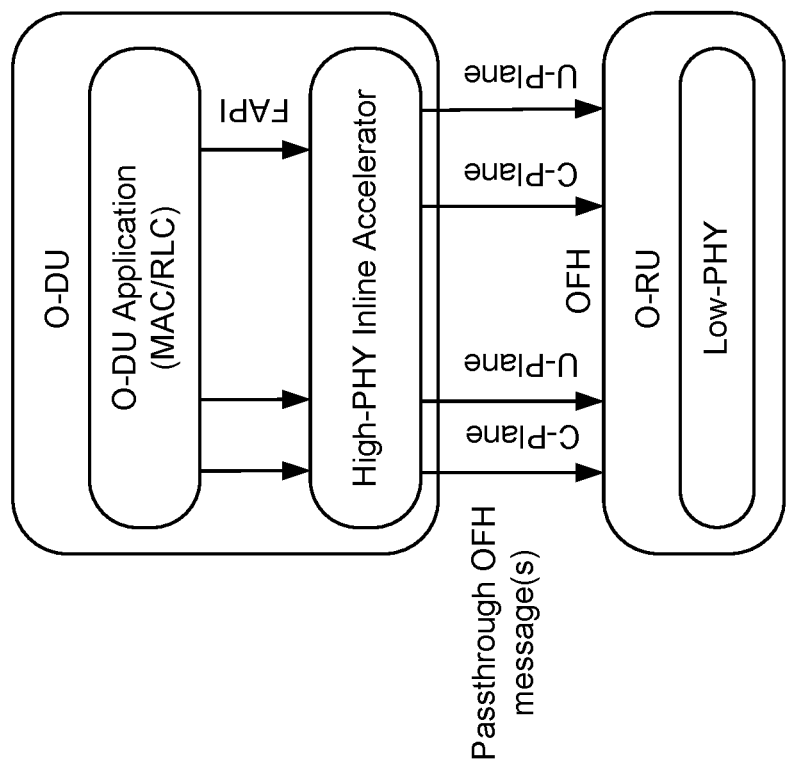
FIG. 7 is a diagram illustrating an example associated with an accelerator passthrough for control plane messages and user plane messages in an O-DU, in accordance with the present disclosure.

FIG. 7 is a diagram illustrating an example 700 associated with an accelerator passthrough for control plane messages and user plane messages in an O-DU, in accordance with the present disclosure.

In some aspects, similar to FIG. 5, messages from the O-DU to an O-RU are depicted, but messages terminated at the O-DU may also be subjected to accelerator pass-through, or subjected to accelerator processing.

In some aspects, the O-DU may execute an O-DU application, which may be associated with a MAC layer. The O-DU application may communicate with an accelerator of the O-DU via a FAPI. The accelerator may include a hardware accelerator and an associated library/driver. The accelerator may be a high PHY layer inline accelerator. The O-DU may communicate with an O-RU, which may be associated with a low PHY layer. The accelerator may be inline since the accelerator may be in between the O-DU application and the O-RU. In some aspects, the accelerator may generate control plane messages and user plane messages based at least in part on the FAPI between the accelerator and the O-DU application, and the control plane messages and the user plane messages may be transmitted to the O-RU. In other words, the control plane messages and the user plane messages generated at the accelerator may be subjected to hardware acceleration at the accelerator. The control plane messages may be OFH control plane messages. In some aspects, certain control plane messages and certain user plane messages may be generated at the O-DU application. These control plane messages and user plane messages may pass through the accelerator, and then may be transmitted to the O-RU. In other words, these control plane messages and user plane messages that are passed through the accelerator may not be subjected to hardware acceleration at the accelerator, which may improve a performance of the accelerator.

In some aspects, a passthrough may be applicable to user plane messages as well as control plane messages, for accelerator profiles that do not support certain channels. For example, for an accelerator that does not support a PDCCH, or for an application that chooses not to make use of hardware acceleration of PDCCH, user plane messages may also be passed through the accelerator. In some aspects, the FAPI between the O-DU application and the accelerator may be used for functions that are accelerated (since these control plane messages and user plane messages are subjected to hardware acceleration at the accelerator), whereas the pass-through of the user plane messages and/or the control plane messages through the accelerator may be used for other functions. In some other aspects, the functions being accelerated may be functional blocks composing particular channels (e.g., low-density parity-check (LDPC) encoding) at the exclusion of some functions that are handled by the application layer (e.g., modulation). In this latter aspect, FAPI functions may be limited to the parameters controlling those accelerated blocks, as well as be enhanced to define the input and output of the accelerated blocks, in particular when the output of one accelerated block is not the input of the immediately subsequent accelerated block or the transposition to/from the OFH transport.

As indicated above, FIG. 7 is provided as an example. Other examples may differ from what is described with regard to FIG. 7.

Figure 8:
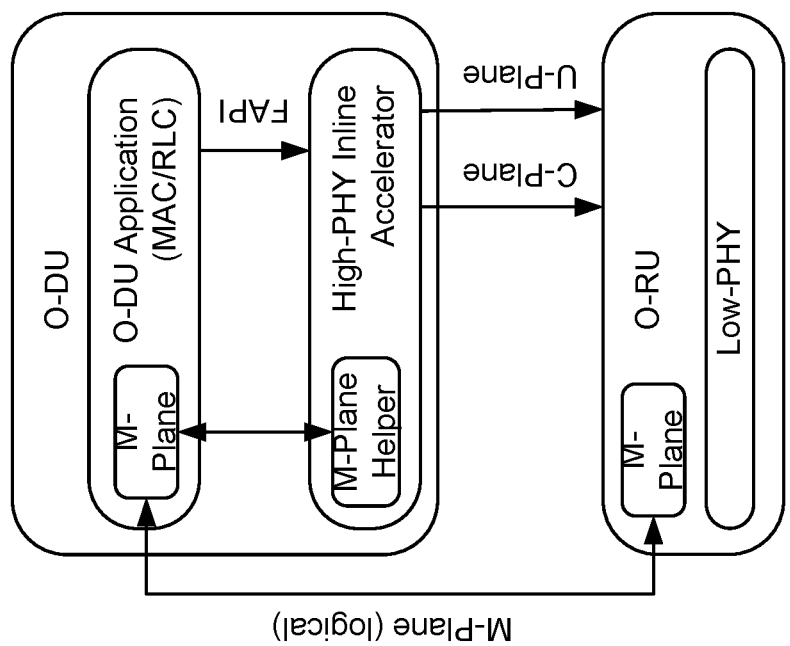
FIG. 8 is a diagram illustrating an example associated with a management plane architecture in an O-DU, in accordance with the present disclosure.

FIG. 8 is a diagram illustrating an example 800 associated with a management plane architecture in an O-DU, in accordance with the present disclosure.

In some aspects, the O-DU may execute an O-DU application. The O-DU application may communicate with an accelerator of the O-DU via a FAPI. The accelerator may include a hardware accelerator and an associated library/driver. The accelerator may be a high PHY layer inline accelerator. The O-DU may communicate with an O-RU, which may be associated with a low PHY layer. The O-DU application may be associated with a management plane (M-Plane), which may reside in the O-DU application. The management plane may reside in the O-DU application and may be assisted by a management plane helper, which may reside in the accelerator. In other words, the management plane may not terminate in the accelerator, but rather the accelerator may include the management plane assister to assist the management plane in the O-DU application. In some aspects, the management plane in the O-DU application may communicate with a management plane in the O-RU. Management plane functions may involve O-RU initialization, discovery, and/or orchestration. Further, the management plane functions may involve a pooling of accelerator resources to switch the O-RU from one accelerator to another accelerator in certain situations.

In some aspects, the assistance may at least partially involve translation between an O-RAN management plane O-DU or O-RU parameters and equivalent FAPI P5 or P19 configuration or capability parameters. The translating may additionally involve the transport of capability and/or configuration parameter between the O-DU and the O-RU, as required for consistent configuration and capability awareness between an application/accelerator interface and the O-DU/O-RU interface.

In some aspects, the management plane may terminate in the O-DU application (or MAC layer), where relevant parameters may be reflected in FAPI operation. The relevant parameters may not include control plane section numbers. In some aspects, the O-DU application may interpret the management plane instead of interpreting a control plane. Further, the relevant parameters may be associated with a semi-static FAPI configuration, which may reflect management plane configured channels.

As indicated above, FIG. 8 is provided as an example. Other examples may differ from what is described with regard to FIG. 8.

In some aspects, control plane messages generated at an O-DU application may be coordinated with or coupled with user plane messages generated at an accelerator, based at least in part on a common understanding of certain FH allocation dimensions. A user plane may be associated with frequency-domain I/Q samples and data at a resource block and symbol level. A control plane may be associated with data-associated control (e.g., scheduling and beamforming). Sections of one or more control plane section types may be needed to interpret/control I/Q samples within a single user plane message for a given eAxC.

In some aspects, with respect to FAPI, a channel protocol data unit (PDU) may be associated with a time and frequency mapping per slot, and a set of spatial streams. The control plane may define, for a set of I/Q samples, an RB or resource element (RE) and symbol mapping of I/Q samples in user plane messages, where the user plane messages may be associated with spatial streams (e.g., eAxC identifiers).

In some aspects, with respect to decoupling the control plane messages and the user plane messages, the accelerator (or PHY layer) may generate I/Q samples expected by the O-RU. The accelerator may skip blank PRBs and/or assign I/Q samples to correct data frame identifiers, which may ensure a correct packaging of the I/Q samples. As a decoupling assumption, a channel PDU may map to a single user plane frame for each symbol, where O-RAN user plane allocations may be rectangular (e.g., time and frequency per slot). In some cases, for decoupling support, an O-RAN user plane frame may aggregate I/Q samples from multiple channels, where the channels may be split into multiple O-RAN user plane frames.

In some aspects, an I/Q data frame allocation in a slot may be represented as a rectangular resource-allocation templates with a PRB and symbol resolution, a bitmap of excluded PRBs and symbols, a deterministic rule for generating I/Q samples, a rule for zero-filling I/Q samples that are not explicitly excluded, and/or an I/Q sample compression scheme, where a data frame may be an irregular shape.

In some aspects, analog and digital beam management may be separated, where digital beams may be associated with channel PDUs and analog beams may be associated with symbols (or slots) and subbands. The beam management may involve correctly filling beam indices and weights in appropriate control plane sections. Precoder/beam indices and/or precoder weights may be controlled by a MAC layer. Dynamic precoder weights may be generated by the accelerator based at least in part on indexing in the MAC layer, where the MAC layer induces the accelerator to generate control plane templates and the accelerator may fill in computed beam weights in the control plane templates. The accelerator may also fill in beam indices from a reserved range (signaled by the MAC layer). In some aspects, in a hybrid beamforming, analog beams may be signaled to the accelerator and may not be transparent, and the FAPI may need on-the-fly updates of analog beamforming entries that may be conveyed over the control plane to the O-RU.

In some aspects, I/Q data frames may be associated with O-RAN beam indices, which may correspond to FAPI precoder indices and/or beams or a combination. An I/Q data frame may be a basic unit to abstract allocation dimensions, and the I/Q data frame may be associated with a rectangular set of PRBs and symbols, with an RE pattern and a set of eAxC identifiers. Further, each PRB or an entire rectangular set may be associated with a set of beam indices, with each beam mapping to an eAxC identifier.

In some aspects, with respect to section and header management, the O-DU application (or MAC layer) may inform the accelerator (or PHY layer) of section identifiers to be associated with user plane data frames. A data frame header may be added to accelerator-generated (or PHY-generated) I/Q samples (or user plane samples), for instance in shared memory, or via concatenation.

In some aspects, an abstraction may involve a shared memory location. The abstraction may correspond to a structure that indicates, for each spatial stream, a symbol identifier, a starting PRB, a total number of PRBs, a compression scheme, and/or a shared memory location. For a downlink, the accelerator may place I/Q samples in the shared memory location. For an uplink, the accelerator may extract I/Q samples from the shared memory location. A trigger mechanism (e.g., an event or an arrival window) may be needed for the uplink to determine when valid I/Q samples are available. In this case, the O-DU application (or MAC layer) may handle fragmentation and eAxC identifier mapping. However, a shared memory location approach may not be favorable for interfaces that do not share memory.

In some aspects, RE mapping abstractions may be transmitted as control plane messages (or sections), which may be interpreted by the accelerator. Each FAPI-style allocation may be linked to control plane section(s) that signal REs resulting from the allocation, a user plane section to hold the REs, and/or a coupling type. "Coupling type" may refer to coupling by section, coupling by frequency and time, or coupling by frequency and time with priorities. In this case, fewer FAPI updates may be needed. However, the accelerator (or O-DU high PHY layer) may need to interpret control plane structures, which may increase complexity at the accelerator.

In some aspects, control plane and user plane coupling may be based at least in part on a section identifier and by frequency and time, such that coordination between the control plane and the user plane may be assumed. Decoupling may be needed to allow control plane passthrough. The decoupling may be achieved via user plane templates and/or capability coordination. The user plane templates may be user plane section placeholders. The O-DU application may be responsible for generating the user plane templates based at least in part on a multiplexing of channels to the user plane templates.

In some aspects, with respect to FAPI capabilities, the O-DU may signal an indication that indicates an ability of the O-DU to support passthrough operation. The O-DU may indicate any restrictions on whether the O-DU supports DU-generated beam weights, and applicable compression techniques and resolution (e.g., section or per-PRB). The O-DU may indicate any restrictions on channels for which control plane passthrough is supported. The O-DU may indicate any restrictions on channels for which user plane passthrough is supported (e.g., for hardware-accelerated compression). The O-DU may indicate any restrictions on support for various FH section extension types (such as when abstractions are signaled in a FH format).

Figure 9:
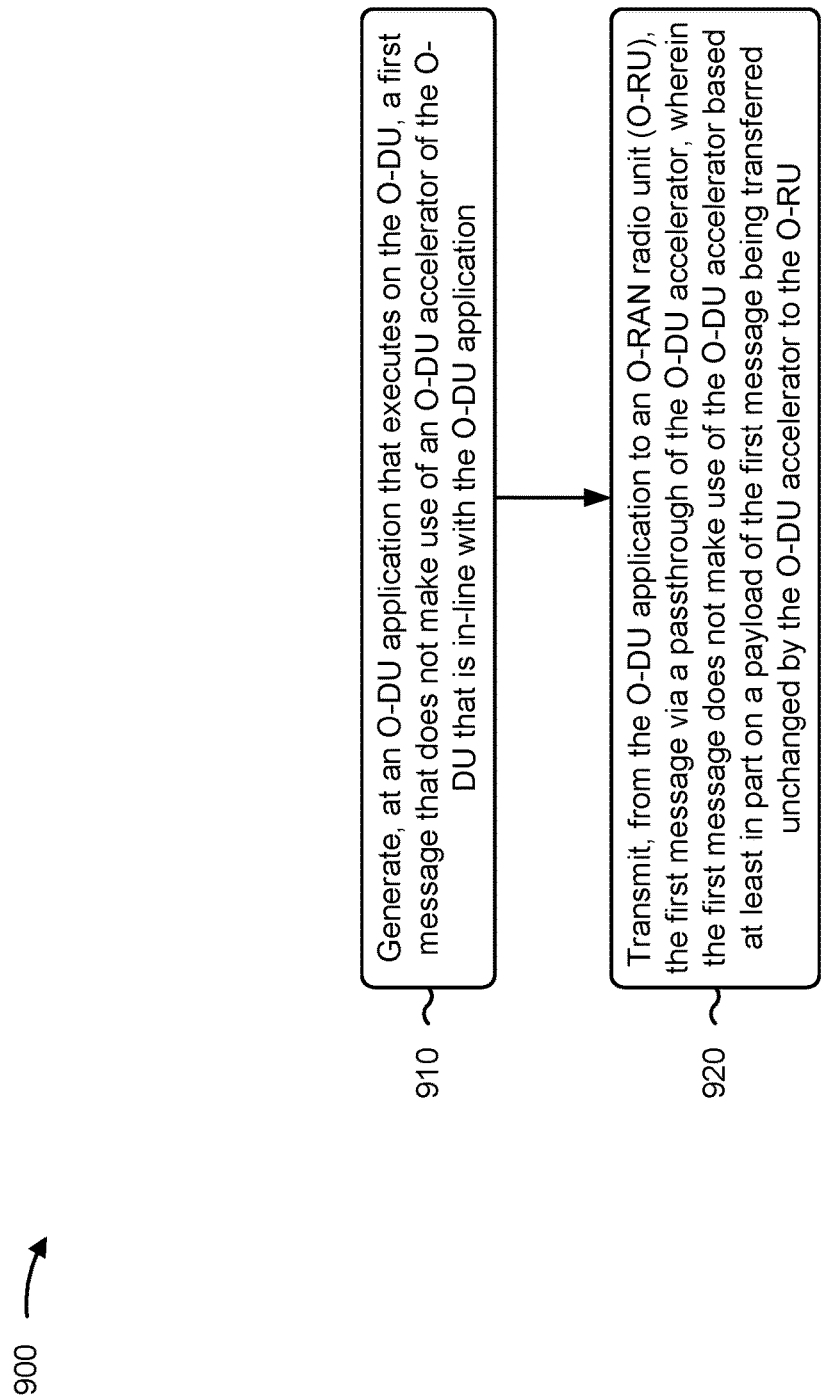
FIG. 9 is a diagram illustrating an example process associated with passthrough of messages in an accelerator of a distributed unit, in accordance with the present disclosure.

FIG. 9 is a diagram illustrating an example process 900 performed, for example, by an O-DU, in accordance with the present disclosure. Example process 900 is an example where the O-DU (e.g., base station 110) performs operations associated with passthrough of messages in an accelerator of a distributed unit.

As shown in FIG. 9, in some aspects, process 900 may include generating, at an O-DU application that executes on the O-DU, a first message that does not make use of an O-DU accelerator of the O-DU that is in-line with the O-DU application (block 910). For example, the O-DU (e.g., using communication manager 150 and/or generation component 1008, depicted in FIG. 10) may generate, at an O-DU application that executes on the O-DU, a first message that does not make use of an O-DU accelerator of the O-DU that is in-line with the O-DU application, as described above.

As further shown in FIG. 9, in some aspects, process 900 may include transmitting, from the O-DU application to an O-RU, the first message via a passthrough of the O-DU accelerator, wherein the first message does not make use of the O-DU accelerator based at least in part on a payload of the first message being transferred unchanged by the O-DU accelerator to the O-RU (block 920). For example, the O-DU (e.g., using communication manager 150 and/or transmission component 1004, depicted in FIG. 10) may transmit, from the O-DU application to an O-RU, the first message via a passthrough of the O-DU accelerator, wherein the first message does not make use of the O-DU accelerator based at least in part on a payload of the first message being transferred unchanged by the O-DU accelerator to the O-RU, as described above.

Process 900 may include additional aspects, such as any single aspect or any combination of aspects described below and/or in connection with one or more other processes described elsewhere herein.

In a first aspect, process 900 includes embedding, at the O-DU accelerator, the payload of the first message over a transport interface towards the O-RU, wherein the first message indicates a compression of beam weights, I/Q samples, or other parameters describing a wireless channel associated with the O-DU.

In a second aspect, alone or in combination with the first aspect, process 900 includes generating, at the O-DU accelerator, a second message based at least in part on a functional application platform interface between the O-DU accelerator and the O-DU application, wherein the second message is generated through hardware acceleration at the O-DU accelerator, and transmitting, from the O-DU accelerator to the O-RU, the second message.

In a third aspect, alone or in combination with one or more of the first and second aspects, the first message is a control plane message, and wherein the second message is a control plane message or a user plane message.

In a fourth aspect, alone or in combination with one or more of the first through third aspects, the first message is associated with a beam weight implicitly knowable to the O-RU indicating that the first message is to be passed through the O-DU accelerator, wherein the beam weight is implicitly known to the O-RU based at least in part on a semi-static configuration, a dynamic configuration, or a dynamic implicit generation at the O-RU from a precoder indication from the O-DU, and the second message is associated with O-DU accelerator-generated information including dynamically-generated information to use in O-DU to O-RU messages, at least one I/Q sample to use in the O-DU to O-RU messages, or at least one parameter signaling a result of accelerator-based decoding when I/Q samples are received from the O-RU.

In a fifth aspect, alone or in combination with one or more of the first through fourth aspects, process 900 includes initiating signaling between the O-DU application and the O-DU accelerator to negotiate types of messages to be passed through the O-DU accelerator and types of messages to be subjected to hardware acceleration at the O-DU accelerator.

In a sixth aspect, alone or in combination with one or more of the first through fifth aspects, process 900 includes supporting a plurality of channels, and the first message is associated with a channel included in the plurality of channels.

In a seventh aspect, alone or in combination with one or more of the first through sixth aspects, process 900 includes initiating signaling between the O-DU application and the O-DU accelerator to negotiate parameters associated with fragmentation or assembly to be performed by the O-DU application or the O-DU accelerator, or initiating signaling between the O-DU application and the O-DU accelerator to negotiate parameters associated with compression or decompression to be performed by the O-DU application or the O-DU accelerator.

In an eighth aspect, alone or in combination with one or more of the first through seventh aspects, process 900 includes generating or interpreting, at the O-DU application, section or header information for a second message that does not pass through the O-DU accelerator; or generating or interpreting, at the O-DU accelerator, the section or header information for the second message based at least in part on input received from the O-DU application.

In a ninth aspect, alone or in combination with one or more of the first through eighth aspects, process 900 includes generating, at the O-DU application, a second message; and transmitting, from the O-DU application to the O-RU, the second message via the passthrough of the O-DU accelerator based at least in part on the O-DU accelerator not supporting a channel associated with the second message.

In a tenth aspect, alone or in combination with one or more of the first through ninth aspects, process 900 includes initiating or terminating, at a management plane entity associated with the O-DU application, management plane signaling with a management plane entity associated with the O-RU, wherein the management plane signaling is associated with an O-RU initialization, an O-RU discovery, or an O-RU orchestration, and wherein the management plane entity resides in the O-DU application and is assisted by a management plane helper which resides in the O-DU accelerator.

In an eleventh aspect, alone or in combination with one or more of the first through tenth aspects, first messages generated at the O-DU application are coordinated with second messages generated at the O-DU accelerator with respect to a time and frequency mapping to data frames, beam indices, or spatial streams.

In a twelfth aspect, alone or in combination with one or more of the first through eleventh aspects, transmitting the first message via the passthrough of the O-DU accelerator is based at least in part on one of: signaling by the O-DU application of locations at which the O-DU accelerator generates or expects I/Q samples, beam weights, beam indices, channel estimates, or decoded data, wherein the locations are associated with first messages that are application-generated or memory locations; signaling by the O-DU application of the I/Q samples, the beam weights, the beam indices, the channel estimates, the decoded data, and other information associated with message headers and parameters to be generated or interpreted by the O-DU accelerator; or signaling by the O-DU application of a second type of messages that are to be used by the O-DU accelerator for generation or interpretation of a first type of messages, wherein the second type of messages is associated with control plane messages, and the first type of messages is associated with control plane messages and user plane messages.

In a thirteenth aspect, alone or in combination with one or more of the first through twelfth aspects, process 900 includes receiving, at the O-DU application from the O-RU, a third message via the passthrough of the O-DU accelerator; and interpreting, at the O-DU application, the third message that does not make use of the O-DU accelerator.

In a fourteenth aspect, alone or in combination with one or more of the first through thirteenth aspects, process 900 includes receiving, at the O-DU accelerator from the O-RU, a fourth message; and interpreting, at the O-DU accelerator, the fourth message based at least in part on a functional application platform interface between the O-DU accelerator and the O-DU application, wherein the fourth message is subjected to hardware acceleration at the O-DU accelerator.

In a fifteenth aspect, alone or in combination with one or more of the first through fourteenth aspects, receiving the third message via the passthrough of the O-DU accelerator comprises extracting, at the O-DU accelerator, a payload of the third message, wherein the third message indicates a decompression of beam weights, I/Q samples, or other parameters describing a wireless channel associated with the O-DU.

In a sixteenth aspect, alone or in combination with one or more of the first through fifteenth aspects, the first message and a second message are associated with O-DU transmitted messages, and the third message and the fourth message are associated with O-DU received messages.

In a seventeenth aspect, alone or in combination with one or more of the first through sixteenth aspects, process 900 includes receiving, at the O-DU application from the O-RU, a third message via the passthrough of the O-DU accelerator based at least in part on the O-DU accelerator not supporting a channel associated with the third message; and interpreting, at the O-DU application, the third message that does not make use of the O-DU accelerator.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
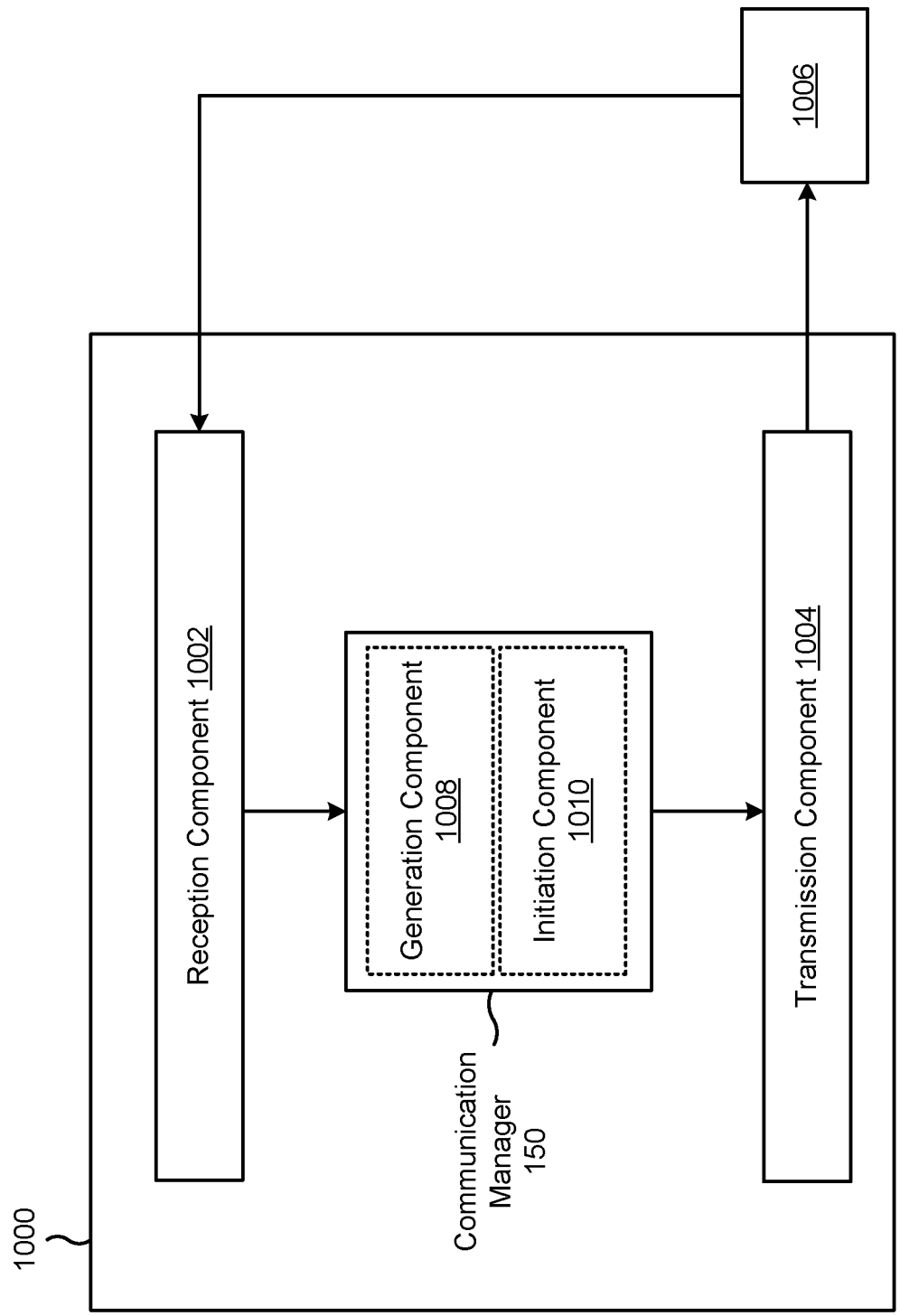
FIG. 10 is a diagram of an example apparatus for wireless communication, in accordance with the present disclosure.

FIG. 10 is a diagram of an example apparatus 1000 for wireless communication. The apparatus 1000 may be an O-DU, or an O-DU may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a generation component 1008, or an initiation component 1010, among other examples.

In some aspects, the apparatus 1000 may be configured to perform one or more operations described herein in connection with FIGS. 5-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the O-DU described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the O-DU described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the O-DU described in connection with FIG. 2. In some aspects, the transmission component 1004 may be co-located with the reception component 1002 in a transceiver.

The generation component 1008 may generate, at an O-DU application that executes on the O-DU, a first message that does not make use of an O-DU accelerator of the O-DU that is in-line with the O-DU application. The transmission component 1004 may transmit, from the O-DU application to an O-RU, the first message via a passthrough of the O-DU accelerator, wherein the first message does not make use of the O-DU accelerator based at least in part on a payload of the first message being transferred unchanged by the O-DU accelerator to the O-RU.

The transmission component 1004 may embed, at the O-DU accelerator, the payload of the first message over a transport interface towards the O-RU, wherein the first message indicates a compression of beam weights, I/Q samples, or other parameters describing a wireless channel associated with the O-DU.

The generation component 1008 may generate, at the O-DU accelerator, a second message based at least in part on a functional application platform interface between the O-DU accelerator and the O-DU application, wherein the second message is subjected to hardware acceleration at the O-DU accelerator. The transmission component 1004 may transmit, from the O-DU accelerator to the O-RU, the second message.

The initiation component 1010 may signaling between the O-DU application and the O-DU accelerator to negotiate types of messages to be passed through the O-DU accelerator and types of messages to be subjected to hardware acceleration at the O-DU accelerator. The initiation component 1010 may initiate signaling between the O-DU application and the O-DU accelerator to negotiate parameters associated with fragmentation or assembly to be performed by the O-DU application or the O-DU accelerator; or initiate signaling between the O-DU application and the O-DU accelerator to negotiate parameters associated with compression or decompression to be performed by the O-DU application or the O-DU accelerator.

The generation component 1008 may generate or interpret, at the O-DU application, section or header information for a second message that does not pass through the O-DU accelerator. The generation component 1008 may generate or interpret, at the O-DU application, section or header information for a second message that does not pass through the O-DU accelerator.

The generation component 1008 may generate, at the O-DU application, a second message. The transmission component 1004 may transmit, from the O-DU application to the O-RU, the second message via the passthrough of the O-DU accelerator based at least in part on the O-DU accelerator not supporting a channel associated with the second message.

The initiation component 1010 may initiate, at a management plane entity associated with the O-DU application, management plane signaling with a management plane entity associated with the O-RU, wherein the management plane signaling is associated with an O-RU initialization, an O-RU discovery, or an O-RU orchestration, and wherein the management plane entity resides in the O-DU application and is assisted by a management plane helper which resides in the O-DU accelerator.

The transmission component 1004 may transmit the first message via the passthrough of the O-DU accelerator based at least in part on one of: signaling by the O-DU application of locations at which the O-DU accelerator generates or expects in-phase and quadrature (I/Q) samples, beam weights, beam indices, channel estimates, or decoded data, wherein the locations are associated with first messages that are application-generated or memory locations; signaling by the O-DU application of the I/Q samples, the beam weights, the beam indices, the channel estimates, the decoded data, and other information associated with message headers and parameters to be generated or interpreted by the O-DU accelerator; or signaling by the O-DU application of a second type of messages that are to be used by the O-DU accelerator for generation or interpretation of a first type of messages, wherein the second type of messages is associated with control plane messages, and wherein the first type of messages is associated with control plane messages and user plane messages.

The reception component 1002 may receive, at the O-DU application from the O-RU, a third message via the passthrough of the O-DU accelerator; and interpret, at the O-DU application, the third message that does not make use of the O-DU accelerator.

The reception component 1002 may receive, at the O-DU accelerator from the O-RU, a fourth message; and interpret, at the O-DU accelerator, the fourth message based at least in part on a functional application platform interface between the O-DU accelerator and the O-DU application, wherein the fourth message is subjected to hardware acceleration at the O-DU accelerator.

The reception component 1002 may extract, at the O-DU accelerator, a payload of the third message, wherein the third message indicates a decompression of beam weights, in-phase and quadrature (I/Q) samples, or other parameters describing a wireless channel associated with the O-DU.

The reception component 1002 may receive, at the O-DU application from the O-RU, a third message via the passthrough of the O-DU accelerator based at least in part on the O-DU accelerator not supporting a channel associated with the third message; and interpret, at the O-DU application, the third message that does not make use of the O-DU accelerator.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
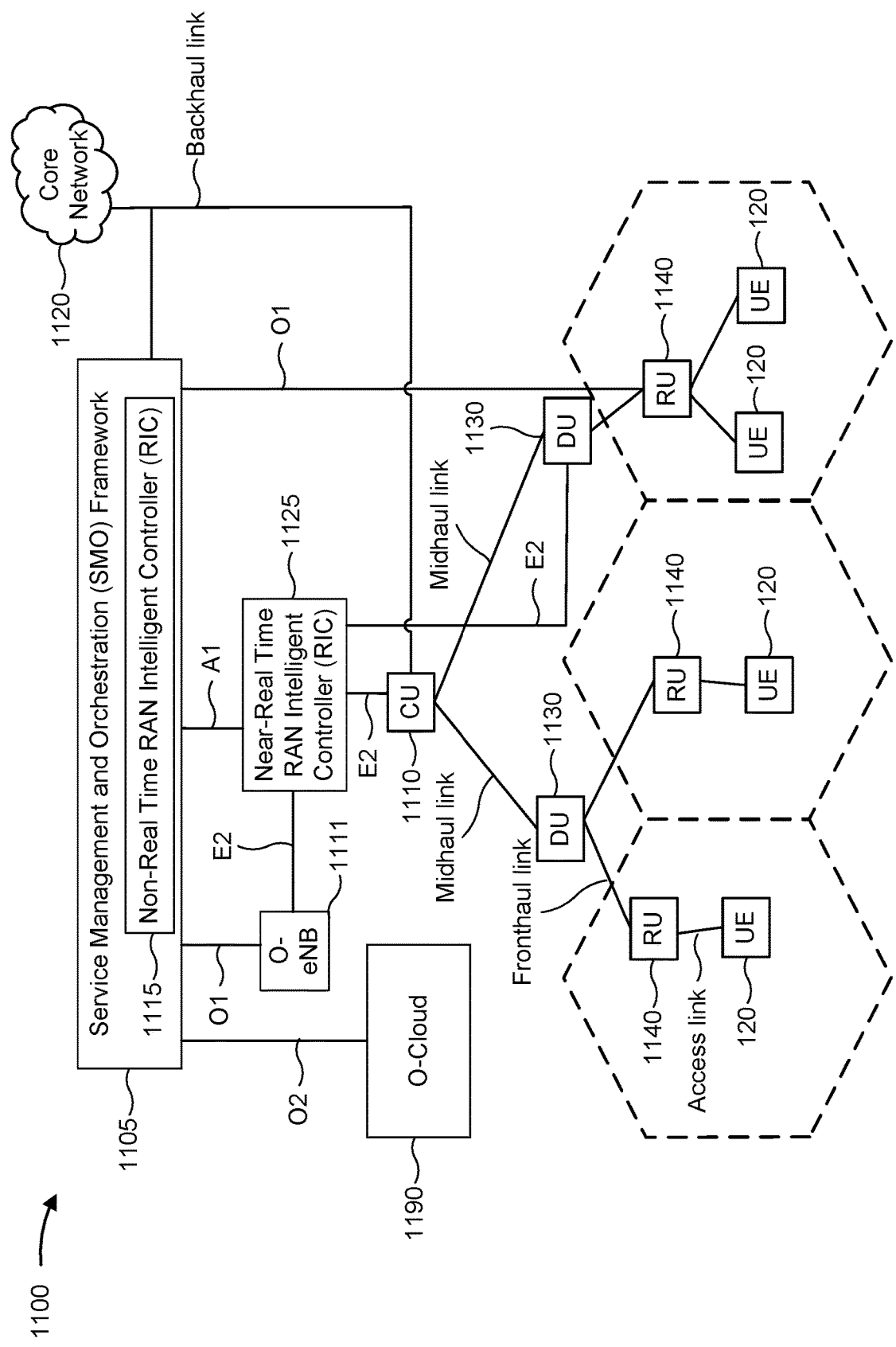
FIG. 11 is a diagram illustrating an example of a disaggregated base station architecture, in accordance with the present disclosure.

FIG. 11 is a diagram illustrating an example 1100 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual centralized unit (VCU), a virtual distributed unit (VDU), or a virtual radio unit (VRU)).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 11 may include one or more CUs 1110 that can communicate directly with a core network 1120 via a backhaul link, or indirectly with the core network 1120 through one or more disaggregated base station units (such as a Near-RT RIC 1125 via an E2 link, or a Non-RT RIC 1115 associated with a Service Management and Orchestration (SMO) Framework 1105, or both). A CU 1110 may communicate with one or more DUs 1130 via respective midhaul links, such as an F1 interface. The DUs 1130 may communicate with one or more RUs 1140 via respective fronthaul links. The RUs 1140 may communicate with respective UEs 120 via one or more radio frequency (RF) access links. In some implementations, the UE 120 may be simultaneously served by multiple RUs 1140.

Each of the units (e.g., the CUs 1110, the DUs 1130, the RUs 1140), as well as the Near-RT RICs 1125, the Non-RT RICs 1115, and the SMO Framework 1105, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1110 may host one or more higher layer control functions. Such control functions can include RRC, PDCP, SDAP, or the like. Each control function can be implemented with an interface configured to communicate signals with other control functions hosted by the CU 1110. The CU 1110 may be configured to handle user plane functionality (e.g., Central Unit-User Plane (CU-UP)), control plane functionality (e.g., Central Unit-Control Plane (CU-CP)), or a combination thereof. In some implementations, the CU 1110 can be logically split into one or more CU-UP units and one or more CU-CP units. The CU-UP unit can communicate bidirectionally with the CU-CP unit via an interface, such as the E1 interface when implemented in an O-RAN configuration. The CU 1110 can be implemented to communicate with the DU 1130, as necessary, for network control and signaling.

The DU 1130 may correspond to a logical unit that includes one or more base station functions to control the operation of one or more RUs 1140. In some aspects, the DU 1130 may host one or more of an RLC layer, a MAC layer, and one or more high PHY layers (such as modules for FEC encoding and decoding, scrambling, modulation and demodulation, or the like) depending, at least in part, on a functional split, such as those defined by the 3GPP. In some aspects, the DU 1130 may further host one or more low-PHY layers. Each layer (or module) can be implemented with an interface configured to communicate signals with other layers (and modules) hosted by the DU 1130, or with the control functions hosted by the CU 1110.

Lower-layer functionality can be implemented by one or more RUs 1140. In some deployments, an RU 1140, controlled by a DU 1130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1140 can be implemented to handle over the air (OTA) communication with one or more UEs 120. In some implementations, real-time and non-real-time aspects of control and user plane communication with the RU(s) 1140 can be controlled by the corresponding DU 1130. In some scenarios, this configuration can enable the DU(s) 1130 and the CU 1110 to be implemented in a cloud-based RAN architecture, such as a vRAN architecture.

The SMO Framework 1105 may be configured to support RAN deployment and provisioning of non-virtualized and virtualized network elements. For non-virtualized network elements, the SMO Framework 1105 may be configured to support the deployment of dedicated physical resources for RAN coverage requirements which may be managed via an operations and maintenance interface (such as an O1 interface). For virtualized network elements, the SMO Framework 1105 may be configured to interact with a cloud computing platform (such as an open cloud (O-Cloud) 1190) to perform network element life cycle management (such as to instantiate virtualized network elements) via a cloud computing platform interface (such as an O2 interface). Such virtualized network elements can include, but are not limited to, CUs 1110, DUs 1130, RUs 1140 and Near-RT RICs 1125. In some implementations, the SMO Framework 1105 can communicate with a hardware aspect of a 4G RAN, such as an open eNB (O-eNB) 1111, via an O1 interface. Additionally, in some implementations, the SMO Framework 1105 can communicate directly with one or more RUs 1140 via an O1 interface. The SMO Framework 1105 also may include a Non-RT RIC 1115 configured to support functionality of the SMO Framework 1105.

The Non-RT RIC 1115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1125. The Non-RT RIC 1115 may be coupled to or communicate with (such as via an A1 interface) the Near-RT RIC 1125. The Near-RT RIC 1125 may be configured to include a logical function that enables near-real-time control and optimization of RAN elements and resources via data collection and actions over an interface (such as via an E2 interface) connecting one or more CUs 1110, one or more DUs 1130, or both, as well as an O-eNB, with the Near-RT RIC 1125.

In some implementations, to generate AI/ML models to be deployed in the Near-RT RIC 1125, the Non-RT RIC 1115 may receive parameters or external enrichment information from external servers. Such information may be utilized by the Near-RT RIC 1125 and may be received at the SMO Framework 1105 or the Non-RT RIC 1115 from non-network data sources or from network functions. In some examples, the Non-RT RIC 1115 or the Near-RT RIC 1125 may be configured to tune RAN behavior or performance. For example, the Non-RT RIC 1115 may monitor long-term trends and patterns for performance and employ AI/ML models to perform corrective actions through the SMO Framework 1105 (such as reconfiguration via O1) or via creation of RAN management policies (such as AI policies).

As indicated above, FIG. 11 is provided as an example. Other examples may differ from what is described with regard to FIG. 11.

The following provides an overview of some Aspects of the present disclosure:

Aspect 1: A method of wireless communication performed by an open radio access network (O-RAN) distributed unit (O-DU), comprising: generating, at an O-DU application that executes on the O-DU, a first message that does not make use of an O-DU accelerator of the O-DU that is in-line with the O-DU application; and transmitting, from the O-DU application to an O-RAN radio unit (O-RU), the first message via a passthrough of the O-DU accelerator, wherein the first message does not make use of the O-DU accelerator based at least in part on a payload of the first message being transferred unchanged by the O-DU accelerator to the O-RU.

Aspect 2: The method of Aspect 1, wherein transmitting the first message via the passthrough of the O-DU accelerator further comprises: embedding, at the O-DU accelerator, the payload of the first message over a transport interface towards the O-RU, wherein the first message indicates a compression of beam weights, in-phase and quadrature (I/Q) samples, or other parameters describing a wireless channel associated with the O-DU.

Aspect 3: The method of any of Aspects 1 through 2, further comprising: generating, at the O-DU accelerator, a second message based at least in part on a functional application platform interface between the O-DU accelerator and the O-DU application, wherein the second message is generated through hardware acceleration at the O-DU accelerator; and transmitting, from the O-DU accelerator to the O-RU, the second message.

Aspect 4: The method of Aspect 3, wherein the first message is a control plane message, and wherein the second message is a control plane message or a user plane message.

Aspect 5: The method of Aspect 3, wherein: the first message is associated with a beam weight implicitly knowable to the O-RU indicating that the first message is to be passed through the O-DU accelerator, wherein the beam weight is implicitly known to the O-RU based at least in part on a semi-static configuration, a dynamic configuration, or a dynamic implicit generation at the O-RU from a precoder indication from the O-DU; and the second message is associated with O-DU accelerator-generated information including: dynamically-generated information to use in O-DU to O-RU messages, at least one in-phase and quadrature (I/Q) sample to use in the O-DU to O-RU messages, or at least one parameter signaling a result of accelerator-based decoding when I/Q samples are received from the O-RU.

Aspect 6: The method of any of Aspects 1 through 5, further comprising: initiating signaling between the O-DU application and the O-DU accelerator to negotiate types of messages to be passed through the O-DU accelerator and types of messages to be subjected to hardware acceleration at the O-DU accelerator.

Aspect 7: The method of any of Aspects 1 through 6, further comprising: supporting a plurality of channels, and the first message is associated with a channel included in the plurality of channels.

Aspect 8: The method of any of Aspects 1 through 7, further comprising: initiating signaling between the O-DU application and the O-DU accelerator to negotiate parameters associated with fragmentation or assembly to be performed by the O-DU application or the O-DU accelerator; or initiating signaling between the O-DU application and the O-DU accelerator to negotiate parameters associated with compression or decompression to be performed by the O-DU application or the O-DU accelerator.

Aspect 9: The method of any of Aspects 1 through 8, further comprising: generating or interpreting, at the O-DU application, section or header information for a second message that does not pass through the O-DU accelerator; or generating or interpreting, at the O-DU accelerator, the section or header information for the second message based at least in part on input received from the O-DU application.

Aspect 10: The method of any of Aspects 1 through 9, further comprising: generating, at the O-DU application, a second message; and transmitting, from the O-DU application to the O-RU, the second message via the passthrough of the O-DU accelerator based at least in part on the O-DU accelerator not supporting a channel associated with the second message.

Aspect 11: The method of any of Aspects 1 through 10, further comprising: initiating or terminating, at a management plane entity associated with the O-DU application, management plane signaling with a management plane entity associated with the O-RU, wherein the management plane signaling is associated with an O-RU initialization, an O-RU discovery, or an O-RU orchestration, and wherein the management plane entity resides in the O-DU application and is assisted by a management plane helper which resides in the O-DU accelerator.

Aspect 12: The method of any of Aspects 1 through 11, wherein first messages generated at the O-DU application are coordinated with second messages generated at the O-DU accelerator with respect to a time and frequency mapping to data frames, beam indices, or spatial streams.

Aspect 13: The method of any of Aspects 1 through 12, wherein transmitting the first message via the passthrough of the O-DU accelerator is based at least in part on one of: signaling by the O-DU application of locations at which the O-DU accelerator generates or expects in-phase and quadrature (I/Q) samples, beam weights, beam indices, channel estimates, or decoded data, wherein the locations are associated with first messages that are application-generated or memory locations; signaling by the O-DU application of the I/Q samples, the beam weights, the beam indices, the channel estimates, the decoded data, and other information associated with message headers and parameters to be generated or interpreted by the O-DU accelerator; or signaling by the O-DU application of a second type of messages that are to be used by the O-DU accelerator for generation or interpretation of a first type of messages, wherein the second type of messages is associated with control plane messages, and wherein the first type of messages is associated with control plane messages and user plane messages.

Aspect 14: The method of any of Aspects 1 through 13, further comprising: receiving, at the O-DU application from the O-RU, a third message via the passthrough of the O-DU accelerator; and interpreting, at the O-DU application, the third message that does not make use of the O-DU accelerator.

Aspect 15: The method of Aspect 14, further comprising: receiving, at the O-DU accelerator from the O-RU, a fourth message; and interpreting, at the O-DU accelerator, the fourth message based at least in part on a functional application platform interface between the O-DU accelerator and the O-DU application, wherein the fourth message is subjected to hardware acceleration at the O-DU accelerator.

Aspect 16: The method of Aspect 14, wherein receiving the third message via the passthrough of the O-DU accelerator comprises: extracting, at the O-DU accelerator, a payload of the third message, wherein the third message indicates a decompression of beam weights, in-phase and quadrature (I/Q) samples, or other parameters describing a wireless channel associated with the O-DU.

Aspect 17: The method of Aspect 16, wherein: the first message and a second message are associated with O-DU transmitted messages; and the third message and the fourth message are associated with O-DU received messages.

Aspect 18: The method of any of Aspects 1 through 17, further comprising: receiving, at the O-DU application from the O-RU, a third message via the passthrough of the O-DU accelerator based at least in part on the O-DU accelerator not supporting a channel associated with the third message; and interpreting, at the O-DU application, the third message that does not make use of the O-DU accelerator.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at an open radio access network (O-RAN) distributed unit (O-DU), comprising:
    one or more memories; and
    one or more processors, coupled to the one or more memories, configured to:
        generate, at an O-DU application that executes on the O-DU, a first message that does not make use of an O-DU accelerator of the O-DU,
        wherein the O-DU accelerator is in-line between the O-DU application and an O-RAN radio unit (O-RU); and
        transmit, from the O-DU application to the O-RU, the first message via a passthrough of the O-DU accelerator,
        wherein the first message passes through the O-DU accelerator based at least in part on a payload of the first message being transferred unchanged by the O-DU accelerator to the O-RU.

2. The apparatus of claim 1, wherein the one or more processors, to transmit the first message via the passthrough of the O-DU accelerator, are configured to:
    embed, at the O-DU accelerator, the payload of the first message over a transport interface towards the O-RU, wherein the first message indicates a compression of beam weights, in-phase and quadrature (I/Q) samples, or other parameters describing a wireless channel associated with the O-DU.

3. The apparatus of claim 1, wherein the one or more processors are further configured to:
generate, at the O-DU accelerator, a second message based at least in part on a functional application platform interface between the O-DU accelerator and the O-DU application, wherein the second message is generated through hardware acceleration at the O-DU accelerator; and
transmit, from the O-DU accelerator to the O-RU, the second message.

4. The apparatus of claim 3, wherein the first message is a control plane message, and wherein the second message is a control plane message or a user plane message.

5. The apparatus of claim 3, wherein:
the first message is associated with a beam weight implicitly knowable to the O-RU indicating that the first message is to be passed through the O-DU accelerator, wherein the beam weight is implicitly known to the O-RU based at least in part on a semi-static configuration, a dynamic configuration, or a dynamic implicit generation at the O-RU from a precoder indication from the O-DU; and
the second message is associated with O-DU accelerator-generated information including: dynamically-generated information to use in O-DU to O-RU messages, at least one in-phase and quadrature (I/Q) sample to use in the O-DU to O-RU messages, or at least one parameter signaling a result of accelerator-based decoding when I/Q samples are received from the O-RU.

6. The apparatus of claim 1, wherein the one or more processors are further configured to:
initiate signaling between the O-DU application and the O-DU accelerator to negotiate types of messages to be passed through the O-DU accelerator and types of messages to be subjected to hardware acceleration at the O-DU accelerator.

7. The apparatus of claim 1, wherein the one or more processors are further configured to support a plurality of channels, and the first message is associated with a channel included in the plurality of channels.

8. The apparatus of claim 1, wherein the one or more processors are further configured to:
initiate signaling between the O-DU application and the O-DU accelerator to negotiate parameters associated with fragmentation or assembly to be performed by the O-DU application or the O-DU accelerator; or
initiate signaling between the O-DU application and the O-DU accelerator to negotiate parameters associated with compression or decompression to be performed by the O-DU application or the O-DU accelerator.

9. The apparatus of claim 1, wherein the one or more processors are further configured to:
generate or interpret, at the O-DU application, section or header information for a second message that does not pass through the O-DU accelerator; or
generate or interpret, at the O-DU accelerator, the section or header information for the second message based at least in part on input received from the O-DU application.

10. The apparatus of claim 1, wherein the one or more processors are further configured to:
generate, at the O-DU application, a second message; and
transmit, from the O-DU application to the O-RU, the second message via the passthrough of the O-DU accelerator based at least in part on the O-DU accelerator not supporting a channel associated with the second message.

11. The apparatus of claim 1, wherein the one or more processors are further configured to:
initiate or terminate, at a management plane entity associated with the O-DU application, management plane signaling with a management plane entity associated with the O-RU, wherein the management plane signaling is associated with an O-RU initialization, an O-RU discovery, or an O-RU orchestration, and wherein the management plane entity resides in the O-DU application and is assisted by a management plane helper which resides in the O-DU accelerator.

12. The apparatus of claim 1, wherein first messages generated at the O-DU application are coordinated with second messages generated at the O-DU accelerator with respect to a time and frequency mapping to data frames, beam indices, or spatial streams.

13. The apparatus of claim 1, wherein the one or more processors are configured to transmit the first message via the passthrough of the O-DU accelerator based at least in part on one of:
signaling by the O-DU application of locations at which the O-DU accelerator generates or expects in-phase and quadrature (I/Q) samples, beam weights, beam indices, channel estimates, or decoded data, wherein the locations are associated with first messages that are application-generated or memory locations;
signaling by the O-DU application of the I/Q samples, the beam weights, the beam indices, the channel estimates, the decoded data, and other information associated with message headers and parameters to be generated or interpreted by the O-DU accelerator; or
signaling by the O-DU application of a second type of messages that are to be used by the O-DU accelerator for generation or interpretation of a first type of messages, wherein the second type of messages is associated with control plane messages, and wherein the first type of messages is associated with control plane messages and user plane messages.

14. The apparatus of claim 1, wherein the one or more processors are configured to:
receive, at the O-DU application from the O-RU, a third message via the passthrough of the O-DU accelerator; and
interpret, at the O-DU application, the third message that does not make use of the O-DU accelerator.

15. The apparatus of claim 14, wherein the one or more processors are further configured to:
receive, at the O-DU accelerator from the O-RU, a fourth message; and
interpret, at the O-DU accelerator, the fourth message based at least in part on a functional application platform interface between the O-DU accelerator and the O-DU application, wherein the fourth message is subjected to hardware acceleration at the O-DU accelerator.

16. The apparatus of claim 15, wherein the one or more processors, to receive the third message via the passthrough of the O-DU accelerator, are configured to:
extract, at the O-DU accelerator, a payload of the third message, wherein the third message indicates a decompression of beam weights, in-phase and quadrature (I/Q) samples, or other parameters describing a wireless channel associated with the O-DU.

17. The apparatus of claim 15, wherein:
the first message and a second message are associated with O-DU transmitted messages; and
the third message and the fourth message are associated with O-DU received messages.

18. The apparatus of claim 1, wherein the one or more processors are further configured to:
receive, at the O-DU application from the O-RU, a third message via the passthrough of the O-DU accelerator based at least in part on the O-DU accelerator not supporting a channel associated with the third message; and
interpret, at the O-DU application, the third message that does not make use of the O-DU accelerator.

19. A method of wireless communication performed by an open radio access network (O-RAN) distributed unit (O-DU), comprising:
generating, at an O-DU application that executes on the O-DU, a first message that does not make use of an O-DU accelerator of the O-DU,
wherein the O-DU accelerator is in-line between the O-DU application and an O-RAN radio unit (O-RU); and
transmitting, from the O-DU application to the O-RU, the first message via a passthrough of the O-DU accelerator,
wherein the first message passes through the O-DU accelerator based at least in part on a payload of the first message being transferred unchanged by the O-DU accelerator to the O-RU.

20. The method of claim 19, wherein transmitting the first message via the passthrough of the O-DU accelerator further comprises:
embedding, at the O-DU accelerator, the payload of the first message over a transport interface towards the O-RU, wherein the first message indicates a compression of beam weights, in-phase and quadrature (I/Q) samples, or other parameters describing a wireless channel associated with the O-DU.

21. The method of claim 19, further comprising:
generating, at the O-DU accelerator, a second message based at least in part on a functional application platform interface between the O-DU accelerator and the O-DU application, wherein the second message is subjected to hardware acceleration at the O-DU accelerator; and
transmitting, from the O-DU accelerator to the O-RU, the second message,
wherein the first message is a control plane message, and wherein the second message is a control plane message or a user plane message,
wherein the first message is associated with a beam weight implicitly knowable to the O-RU indicating that the first message is to be passed through the O-DU accelerator, wherein the beam weight is implicitly known to the O-RU based at least in part on a semi-static configuration, a dynamic configuration, or a dynamic implicit generation at the O-RU from a precoder indication from the O-DU, and
wherein the second message is associated with O-DU accelerator-generated information including: dynamically-generated information to use in O-DU to O-RU messages, at least one in-phase and quadrature (I/Q) sample to use in the O-DU to O-RU messages, or at least one parameter signaling a result of accelerator-based decoding when I/Q samples are received from the O-RU.

22. The method of claim 19, further comprising:
initiating signaling between the O-DU application and the O-DU accelerator to negotiate types of messages to be passed through the O-DU accelerator and types of messages to be subjected to hardware acceleration at the O-DU accelerator;
supporting a plurality of channels, and the first message is associated with a channel included in the plurality of channels; or
initiating or terminating, at a management plane entity associated with the O-DU application, management plane signaling with a management plane entity associated with the O-RU, wherein the management plane signaling is associated with an O-RU initialization, an O-RU discovery, or an O-RU orchestration, and wherein the management plane entity resides in the O-DU application and is assisted by a management plane helper which resides in the O-DU accelerator.

23. The method of claim 19, further comprising:
initiating signaling between the O-DU application and the O-DU accelerator to negotiate parameters associated with fragmentation or assembly to be performed by the O-DU application or the O-DU accelerator; or
initiating signaling between the O-DU application and the O-DU accelerator to negotiate parameters associated with compression or decompression to be performed by the O-DU application or the O-DU accelerator.

24. The method of claim 19, further comprising:
generating, at the O-DU application, a second message; and
transmitting, from the O-DU application to the O-RU, the second message via the passthrough of the O-DU accelerator based at least in part on the O-DU accelerator not supporting a channel associated with the second message.

25. The method of claim 19, wherein transmitting the first message via the passthrough of the O-DU accelerator is based at least in part on one of:
signaling by the O-DU application of locations at which the O-DU accelerator generates or expects in-phase and quadrature (I/Q) samples, beam weights, beam indices, channel estimates, or decoded data, wherein the locations are associated with first messages that are application-generated or memory locations;
signaling by the O-DU application of the I/Q samples, the beam weights, the beam indices, the channel estimates, the decoded data, and other information associated with message headers and parameters to be generated or interpreted by the O-DU accelerator; or
signaling by the O-DU application of a second type of messages that are to be used by the O-DU accelerator for generation or interpretation of a first type of messages, wherein the second type of messages is associated with control plane messages, and wherein the first type of messages is associated with control plane messages and user plane messages.

26. The method of claim 19, further comprising:
receiving, at the O-DU application from the O-RU, a third message via the passthrough of the O-DU accelerator; and
interpreting, at the O-DU application, the third message that does not make use of the O-DU accelerator.

27. The method of claim 26, further comprising:
receiving, at the O-DU accelerator from the O-RU, a fourth message; and interpreting, at the O-DU accelerator, the fourth message based at least in part on a functional application platform interface between the O-DU accelerator and the O-DU application, wherein the fourth message is subjected to hardware acceleration at the O-DU accelerator.

28. The method of claim 27, wherein receiving the third message via the passthrough of the O-DU accelerator comprises:
   extracting, at the O-DU accelerator, a payload of the third message, wherein the third message indicates a decompression of beam weights, in-phase and quadrature (I/Q) samples, or other parameters describing a wireless channel associated with the O-DU,
      wherein the first message and a second message are associated with O-DU transmitted messages, and the third message and the fourth message are associated with O-DU received messages.

29. A non-transitory computer-readable medium storing a set of instructions for wireless communication, the set of instructions comprising:
   one or more instructions that, when executed by one or more processors of an open radio access network (O-RAN) distributed unit (O-DU), cause the O-DU to:
      generate, at an O-DU application that executes on the O-DU, a first message that does not make use of an O-DU accelerator of the O-DU,
      wherein the O-DU accelerator is in-line between the O-DU application and an O-RAN radio unit (O-RU); and
      transmit, from the O-DU application to the O-RU, the first message via a passthrough of the O-DU accelerator,
      wherein the first message passes through the O-DU accelerator based at least in part on a payload of the first message being transferred unchanged by the O-DU accelerator to the O-RU.

30. An apparatus for wireless communication, comprising:
   means for generating, at an application that executes on the apparatus, a first message that does not make use of an accelerator of the apparatus,
   wherein the accelerator is in-line between the application and an O-RAN radio unit (O-RU); and
   means for transmitting, from the application to the O-RU, the first message via a passthrough of the accelerator,
   wherein the first message passes through the accelerator based at least in part on a payload of the first message being transferred unchanged by the accelerator to the O-RU.

* * * * *